(12) United States Patent
Griffin et al.

(10) Patent No.: US 8,483,784 B2
(45) Date of Patent: Jul. 9, 2013

(54) MOBILE COMMUNICATIONS DEVICE HAVING A ROTATABLE MEMBER

(75) Inventors: Jason Tyler Griffin, Waterloo (CA); Martin Riddiford, London (GB); James Reeves, Berkshire (GB); Julia Allwright, London (GB)

(73) Assignee: Research In Motion Limited, Waterloo (CA)

( * ) Notice: Subject to any disclaimer, the term of this patent is extended or adjusted under 35 U.S.C. 154(b) by 863 days.

(21) Appl. No.: 12/641,532

(22) Filed: Dec. 18, 2009

(65) Prior Publication Data
US 2011/0151947 A1 Jun. 23, 2011

(51) Int. Cl.
*H04M 1/00* (2006.01)

(52) U.S. Cl.
USPC .......... 455/575.3; 455/575.1; 455/575.4; 455/90.3; 455/347; 455/349; 379/433.01; 379/433.11; 379/433.13; 16/343; 16/347

(58) Field of Classification Search
USPC ....... 455/575.1, 575.3, 575.4, 90.3, 347–349, 455/566; 379/433.01, 433.04, 433.07, 433.11, 379/433.12, 433.13; 16/247, 248, 249, 343, 16/347; D14/138 R, 138 AB
See application file for complete search history.

(56) References Cited

U.S. PATENT DOCUMENTS

| | | | |
|---|---|---|---|
| 5,103,376 A | 4/1992 | Blonder | |
| 5,255,214 A | 10/1993 | Ma | |
| 5,268,817 A | 12/1993 | Miyagawa et al. | |
| 5,276,589 A | 1/1994 | Bartlett et al. | |
| 5,410,447 A | 4/1995 | Miyagawa et al. | |
| 5,548,478 A | 8/1996 | Kumar et al. | |
| 5,644,469 A | 7/1997 | Shioya et al. | |
| 5,706,167 A | 1/1998 | Lee | |

(Continued)

FOREIGN PATENT DOCUMENTS

| | | |
|---|---|---|
| EP | 1670218 A1 | 6/2006 |
| EP | 1699208 A1 | 9/2006 |

(Continued)

OTHER PUBLICATIONS

Print out of photograph and description of Kohjinsha SX-series as retrieved from <http://www.engadget.com/2008/06/23/kohjinsha-sx-series-convertible-tablet-edges-out-ofumpc-territo/> on Sep. 1, 2009.

(Continued)

*Primary Examiner* — Tuan A Tran
(74) *Attorney, Agent, or Firm* — Novak Druce Connolly Bove + Quigg LLP

(57) ABSTRACT

A mobile communication device may include at least a lid member and a base member which are hingeably coupled together by a linkage mechanism. The device may include additional interface elements on an interface surface accessible when the device is in the closed position. A mobile communication device is provided which further comprises a rotatable member having an interface surface. The linkage mechanism actuates movement of the rotatable member from a first rotation state, such that the interface surface is accessible when the device is in a closed position, to a second rotational state, such that the interface surface is positioned between and concurrently viewable with inner surfaces of the lid and base members when the device is in an opened position. The linkage mechanism actuates the movement of the rotatable member responsive to movement of the device from the closed to the opened position and vice versa.

20 Claims, 25 Drawing Sheets

U.S. PATENT DOCUMENTS

| | | | |
|---|---|---|---|
| 5,900,848 A | | 5/1999 | Haneda et al. |
| D416,003 S | | 11/1999 | Schiefer et al. |
| 6,005,767 A | | 12/1999 | Ku et al. |
| 6,266,236 B1 | | 7/2001 | Ku et al. |
| 6,434,371 B1 | | 8/2002 | Claxton |
| 6,532,147 B1 | | 3/2003 | Christ, Jr. |
| 6,556,435 B1 | | 4/2003 | Helot et al. |
| 6,827,409 B2 | | 12/2004 | Michael |
| 6,903,927 B2 | | 6/2005 | Anlauff |
| 7,079,872 B2 | | 7/2006 | Khalid et al. |
| 7,140,074 B2 | | 11/2006 | Han et al. |
| 7,197,346 B2 | | 3/2007 | Eromaki et al. |
| 7,221,562 B2 | | 5/2007 | Song |
| 7,277,275 B2 | | 10/2007 | Won et al. |
| 7,414,834 B2 | | 8/2008 | Ukonaho et al. |
| 7,418,275 B2 | | 8/2008 | Yiu |
| 7,512,426 B2 | | 3/2009 | Maatta et al. |
| 7,567,830 B2* | | 7/2009 | Hur ............... 455/575.4 |
| 7,599,181 B2 | | 10/2009 | Chuang et al. |
| 7,844,915 B2 | | 11/2010 | Platzer et al. |
| 8,074,323 B2* | | 12/2011 | Lin ................... 16/345 |
| 8,086,290 B2* | | 12/2011 | Yoon et al. ............ 455/575.4 |
| 8,108,017 B2* | | 1/2012 | Jang et al. ............ 455/575.4 |
| 8,152,147 B2* | | 4/2012 | Yang ................ 267/155 |
| 8,190,219 B2* | | 5/2012 | Park et al. ............ 455/575.4 |
| 8,265,719 B2* | | 9/2012 | Lindvall ............ 455/575.4 |
| 8,286,307 B2* | | 10/2012 | Cheng et al. ............ 16/330 |
| 2002/0038493 A1* | | 4/2002 | Ko et al. ............ 16/303 |
| 2002/0126441 A1 | | 9/2002 | Kuo et al. |
| 2003/0197745 A1 | | 10/2003 | Daly |
| 2005/0083644 A1 | | 4/2005 | Song |
| 2005/0099533 A1 | | 5/2005 | Matsuda et al. |
| 2005/0200608 A1 | | 9/2005 | Ulla et al. |
| 2006/0012563 A1 | | 1/2006 | Fyke et al. |
| 2006/0038795 A1 | | 2/2006 | Lee |
| 2006/0071916 A1 | | 4/2006 | Jeun |
| 2006/0148543 A1 | | 7/2006 | Hunt |
| 2006/0252471 A1* | | 11/2006 | Pan ............... 455/575.4 |
| 2007/0086155 A1 | | 4/2007 | Chen et al. |
| 2007/0183123 A1 | | 8/2007 | Chuan et al. |
| 2008/0000048 A1 | | 1/2008 | Petrella |
| 2008/0044007 A1 | | 2/2008 | Fujii |
| 2008/0068786 A1 | | 3/2008 | Cheng et al. |
| 2008/0161075 A1* | | 7/2008 | Kim et al. ............ 455/575.4 |
| 2008/0287167 A1 | | 11/2008 | Caine |
| 2009/0048006 A1 | | 2/2009 | Liao et al. |
| 2009/0061956 A1 | | 3/2009 | Matsuoka |
| 2009/0061959 A1 | | 3/2009 | Cheng et al. |
| 2009/0147458 A1 | | 6/2009 | Wang |
| 2009/0227301 A1 | | 9/2009 | Lindvall |
| 2010/0113100 A1* | | 5/2010 | Harmon et al. ............ 455/566 |
| 2010/0151924 A1 | | 6/2010 | Amano |
| 2010/0232102 A1 | | 9/2010 | Walker et al. |
| 2010/0296232 A1 | | 11/2010 | Yeh et al. |
| 2010/0299873 A1* | | 12/2010 | Song ................ 16/236 |
| 2011/0038108 A1 | | 2/2011 | Chang et al. |
| 2011/0122553 A1 | | 5/2011 | Griffin et al. |
| 2011/0221319 A1 | | 9/2011 | Law et al. |
| 2011/0312392 A1 | | 12/2011 | Reeves et al. |

FOREIGN PATENT DOCUMENTS

| | | |
|---|---|---|
| EP | 1760998 A2 | 3/2007 |
| EP | 1835703 A1 | 9/2007 |
| EP | 1838072 A2 | 9/2007 |
| EP | 2031839 A1 | 3/2009 |
| EP | 2346231 A1 | 7/2011 |
| JP | 2004235687 A | 8/2004 |
| KR | 20060076338 | 7/2006 |
| WO | 2008056019 A1 | 5/2008 |
| WO | 2009038375 A2 | 3/2009 |
| WO | 2009099275 A2 | 8/2009 |

OTHER PUBLICATIONS

Print out of <http://www.lcwprops.com/upload/catalog/lcw_4718.jpg>, accessed at least on Sep. 1, 2009.

Print out of a photograph of Electronic Rolodex w/Auto Dialfirst retrieved from <http://www.j-syscomputers.com/invtpageALL.htm> on Sep. 1, 2009.

Extended European Search Report in respect of European Patent Application No. 10166228.6 dated Dec. 23, 2010.

Printout of photograph and related news article oflenovo-thinkpad-x61-tablet-pc.jpg(JPEG Image, 490x505 pixels) http://crunchgear.com/wp-content/uploads/lenovo-thinkpad-x61-tablet. Retrieved Dec. 16, 2010.

Geoff Gasior.;Printout of photograph and related news article of Inspiron Duo convertible tablet dated, detailed, and priced—The Tech Report. http://techreport.com/discussions.x/20012.published Nov. 18, 2010.

Printout of photograph of dell-duo.jpg(JPEG Image, 490x348 pixels) http://netbookreview.co.uk/wp-content/uploads/2010/11/dell-duo.jpg. Retrieved on Dec. 3, 2010.

Printout of dell inspiron_duapng (PNG image, 300x300 pixels). http://www.itproportal.com/media-site/photos/dell_inspiron_duo.png. retrieved Dec. 16, 2010.

Printout of http://pencomputing.com/images/TPCEvosequence.jpg. Retrieved Dec. 9, 2010.

Printout of oqo_468.jpg(JPEG Image, 468x312 pixels) http://www.ubergizmo.com/photos/200711/oqo_468.jpg. Retrieved Dec. 16, 2010.

Printout of photograph and related news article of Samsung Gloria to be a 10-inch Windows 7 tablet with slide-out keyboard? http://www.engadget.com/2010/12/08/samsung-gloria-to-be-a-10-inch. Retrieved Dec. 8, 2010.

Printout of photograph and related news article of Samsung Gloria-Samsung Glora tablet to come with slide-out key board? http://www.ubergizmo.com/15/archives/2010/12/samsung_glora_tablet_to_come_with_slide.Published on Dec. 8, 2010 and retrieved on Dec. 9, 2010.

Aflalo, Marc., Printout of photograph and related news article of BoxWave's Keyboard Buddy as retreieved from <http://www.yourtechreport.com/2010/11/18/slide-out-that-keyboard-on-your-iphone-4/>Published on Nov. 18, 2010 and retrieved on Dec. 8, 2010.

Gurman, Mark., Printout of photograph and related news article of Boxwave's Keyboard Buddy cases gives your iphone 4 physical keys; Change your iPhone's life. http://www.9to5mac.com/362901boxwaves-keyboard-buddy-cases. Published on Nov. 17, 2010 and retrieved on Dec. 16, 2010.

Printout of photographs of Product Picture Gallery for Phone with Full Slide-Out Keyboard, 3.2, Intuitive Touch Screen, Wifi, Java Extension, TV, 2MP Camera- recommend [MBP-447-MX]-Picture #2. as retrieved from <http://tradestead.com/images-phone-full-slide-out-keyboard-3-2-intuitive-touch-screen-wifi-recommend_p10990_n2.html> Retrieved Dec. 16, 2010.

Printout of photographs and related article of Murph, Darren., Intel's UrbanMax concept device demonstrated on video-Engadget. http://www.engadget.com/2008/08/20/intels-urbanmax-concept-device. Published on Aug. 20, 2008 and retrieved Dec. 16, 2010.

Linder, Brad.; Printout of photograph and related article of Eking introduces a portable tablet with a slide -out keyboard. http://liliput-ing.com2010/07eking-introduces-aportable-tablet-with-a-slide-out-keyboard.Published Jul. 22, 2010 and retrieved Dec. 16, 2010.

Printout of photograph and related article of Eking E5 UMPC brings tilting, sliding 5 -inch display. http://techfused.com/ eking-e5-umpc-brings-tilting-slidings-5-inch-display. Published Aug. 21, 2010 and retrieved on Dec. 16, 2010.

Printout of photograph and related article of Eking's latest portable tablet with a slide-out keyboard-labtops, netbooks, notebook. http://www.laptoinyo.com/2010/07ekings-latest-portable-tablet-with-a-slide-out-keyboaard.Published Jul. 23, 2010 and retrieved on Dec. 9, 2010.

Printout of photograph and related article of Eking M5 side slide MID arrives. Cloned in China. http://www.clonedinchina.com/2010/08/eking-m5-side-slide-mid. Published Aug. 21, 2010 and retrieved Dec. 16, 2010.

Printout of photograph of Flicker from yahoo. EKing S515 Slider UMPC/Flicker-Photo Sharing! http://www.flicker.com/photo/umpcportal/4162816984/in/photostream/. Photo taken Dec. 6, 2009 and retrieved on Jan. 3, 2012.

Printout of photograph and related description of Tablet Dock with combo DVD CD-RW Drive+AC Adapter. http://www.vcoach.net/VC/general/products/accessories.asp. Retrieved Dec. 9, 2010.

Printout of photograph and related description of Rocketfish Adjustable Notebook Stand. ; Rocketfish Adjustable Notebook Stand—recommendation by xsalvador—http://www.thisnext.com/item/AD19BBDB/EDCAD0F5/Rocketfish-Adjustable-Notebook;ThisNext.Published Jun. 11, 2008 and retrieved on Dec. 9, 2010.

Printout of http://www.assistiveit.co.uk/images/labtop%20stand.jpg. Retrieved on Dec. 9, 2010.

Printout of photograph and related description of The Portabook labtop stand. http://laptoppimp.com/labtop-accessories/the-portPublished Jul. 2, 2009 and retrieved on Dec. 9, 2010.

Printout of Acer_travelmate_c210_1.gif(GIF Image, 340x162 pixels) http://laptoping.com/wp-content/acer_travelmatec210_1.gif. Retrieved Dec. 16, 2010.

Printout of Clio_c1050.jpg (JPEG Image, 423x415 pixels). http://pdadb.netlimg/clio_c1050.jpg. Retrieved Dec. 3, 2010.

Printout of Vadem_Clio-group.jpg(JPEG image, 360x273 pixels) http://www.smartphonemag.com/_archives/JAN00/imagesNadem_Clio. Retrieved Dec. 3, 2010.

Printout of PICT0564.JPG (JPEG Image, 400x267 pixels) http://thetabletpc.net/Photos-WinHec/Pict0564.JPG. retrieved Dec. 16, 2010.

Picture of iPad keyboard Dock retrieved from http://reviews.cnet.com/keyboards/apple-ipad-keyboard-dock/4505-31334_7-34058880.html?tag=content;get-selector#reviewPage1. posted on Apr. 20, 2010.

Printout of Epstein, A. Linda.; Hp TC1100 Tablet PC review.; tabletPC2.com; The place for tablet PC companies, News, Reviews and Information .HP Compaq TC1100 Review. Published Mar. 2004 and Retrieved on Jan. 27, 2012.

Printout of Kohjinsha SX-series convertible tablet edges out of UMPC territory. http://www.engadget.com/2008/06/23/kohjinsha-sx-series-convertible-tablet-edges-out-of-umpcterrito. Published Sep. 9, 2009.

Printout of Ong, Khang Jin.; Review: Nokia N93 Multimedia Marvel. http://www.mobileburn.com/review.jsp?id=2917. Published Dec. 4, 2006 and retrieved on Jan. 30, 2012.

Extended European Search report mailed Sep. 9, 2010. In corresponding application No. 10150910.7.

Partial European Search report mailed Jun. 1, 2010. In corresponding application No. 10150910.7.

Printout of Friction stay hinge.; http://www.ecplaza.net/tradeleads/seller/4335838/friction_stay_hinge.html. Published Feb. 16, 2009 and retrieved on Jun. 9, 2010.

Picture and description of MPH Cell Phone Hinge.; www.sugatsune.net/Industrial_Hardware_Components/Products/ productdetails.cfm?CATID=78,SUBCATID=48,Productid=MPH]. Accessed at least on May 26, 2009.

Picture and description of HG-JHW Soft-Close Dampening Hinge. www.sugasune.net/Industrial_Hardware_Components/Products/productdetails.cfm?CATID=7&Subcatid=4&Productid=HG-JHW]. Accessed at least on May 26, 2009.

Picture and description of HG-JH210 Lift Assist Hinge. [www.sugatsune.net/Industrial_Hardware-Components/Products/productdetails.cfm?CATID=7&Subcatid=4&productid=MPH]. Accessed at least on May 26, 2009.

Extended European Search report mailed May 6, 2011. In corresponding application No. 11162190.0.

Extended European Search report mailed Nov. 15, 2011. In corresponidng application No. 11177125.9.

Extended European Search report mailed Jan. 3, 2012. In corresponding application No. 11177100.2.

Extended European Search report mailed Jan. 26, 2012. In corresponding application number11177125.9.

Non-Final office Action mailed Dec. 14, 2011.In corresponding U.S. Appl. No. 12/687,947.

Non-Final office Action mailed Dec. 9, 2011. In corresponding U.S. Appl. No. 12/816,552.

Printout of a photograph of Electronic Rolodex w/ Auto Dialfirst retrieved from <http://www.j-syscomputers.com/invtypageALL.htm> on Sep. 1, 2009.

English translation of Patent Abstract of Japan, Publication No. 2004235687.

Printout of an English machine translation of JP 2004235687 obtained from <http://www.4.ipdl.inpit.go.jp/Tokujitu/tjsogodben.ipdl?N0000=115.

Printout of <http://www.lcwprops.com/upload/catalog/lcw_4718.jpg> accessed at least on Sep. 1, 2009.

Extended European Search Report dated Jun. 14, 2010. In corresponding Application No. 09180013.6.

"Extended European Search Report" issued from EP 11162200.7 on Jul. 7, 2011.

A print out of an English machine translation of JP 2004235687, which is listed above, obtained from <http://www4.ipdl.inpit.go.jp/Tokujitu/tjsogodben.ipdl?N0000=115>.

Print out of photographs of Flip mobile phone SIBA E381 + with Roatate 180 degrees camera (dual sim phone) retrieved from http://www.alibaba.com/seo/buyseoLead.htm?Search Text=Flip%20mobile%20phone%20SIBM%20E381+%20with%20Roate%20180%20degrees%camera%20IndexArea=product_en, accessed on May 12, 2009.

* cited by examiner

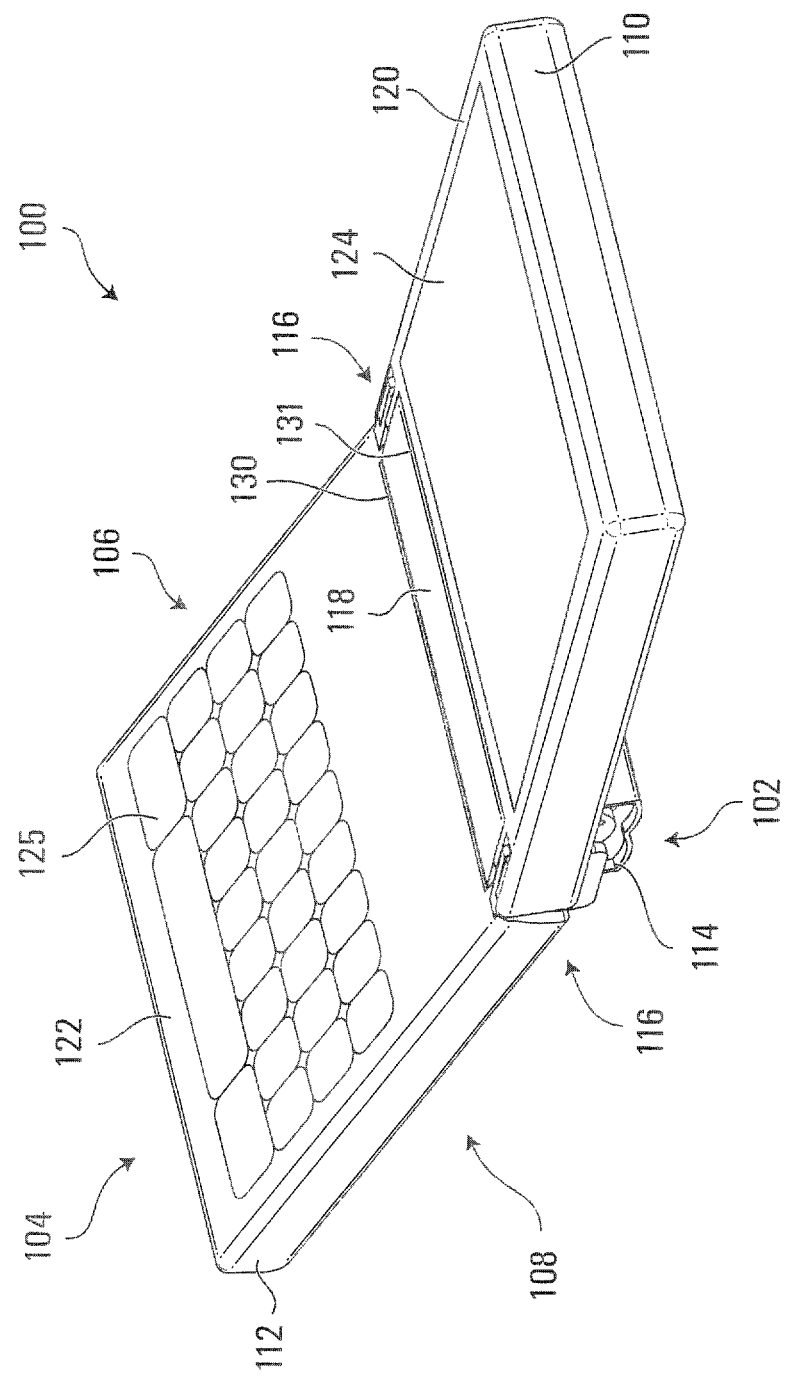

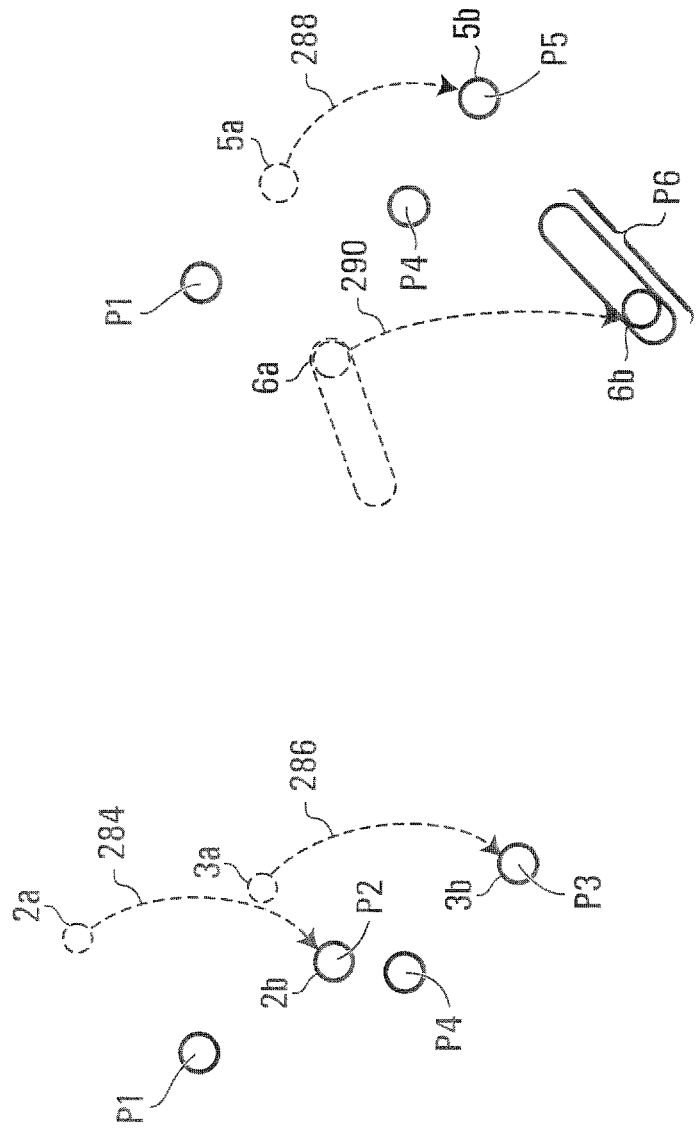

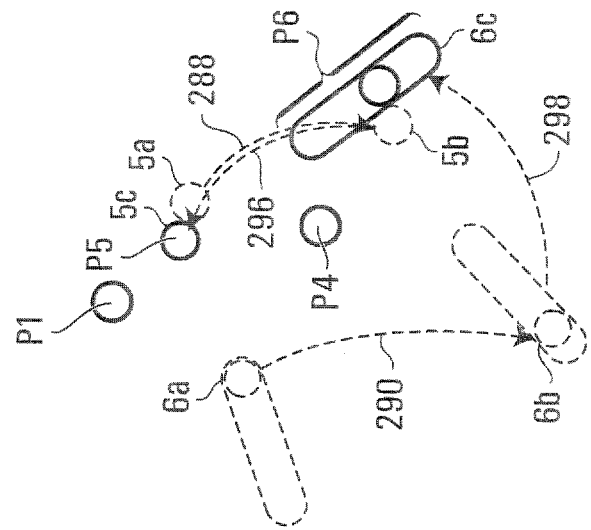
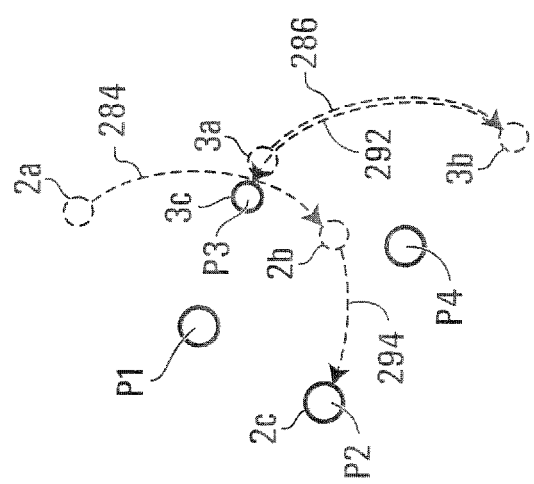
FIG. 12A
FIG. 12B

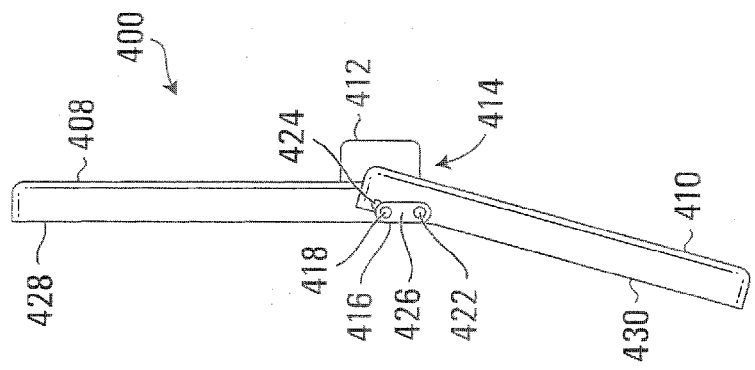
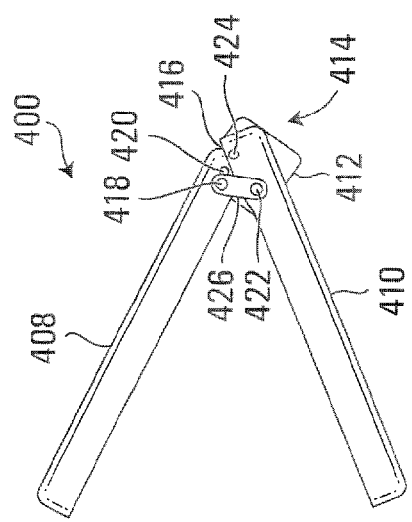
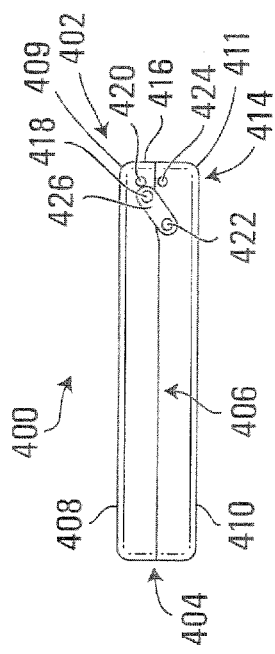
FIG. 13C
FIG. 13B
FIG. 13A

MOBILE COMMUNICATIONS DEVICE HAVING A ROTATABLE MEMBER

FIELD

The application relates to mobile communication devices, and more particularly to mobile communication devices having first and second body members which may be arranged in opened and closed positions.

BACKGROUND

A mobile communication device, such as a "flip phone" or "clamshell" type handheld mobile communication device, may have a linked end and an opposite free end. The device may comprise at least a first body member and a second body member which are coupled together at the linked end by a hinge or linkage mechanism such that the device can move between a closed position and an opened position. The first and second body members are commonly referred to as lid and base members respectively.

The lid and base members may commonly include a graphical display and keyboard respectively. The graphical display and keyboard can be on respective inner surfaces of the lid and base members. In the closed position, the inner surfaces of the lid and base members may be adjacent and not accessible to a user of the device. In the opened position, the inner surfaces may be accessible, and the graphical display and keyboard may, therefore, also be accessible to a user of the device.

In a mobile communication device, such as a flip phone device, it may be desirable for some functions to be available when the device is closed. A user of the device may, for example, desire to check the device status, control media, silence a ringer, play games, use a camera integrated in the device, or send or receive other information while the device is in the closed position. Therefore, the device may further include interface elements, such as a touch screen, on an interface surface which is located on an outer surface of the device in order to be accessible by a user of the device when the flip phone is in a closed position.

In a conventional mobile communication device, interface elements on an outer surface of the device may not be easily accessible when the device is in the open position. For example, when the device is in the open position, the outer surface with the interface elements may not face the same direction as the inner surfaces having a graphical display and keyboard. The interface elements may also be hidden or partially hidden by the lid and/or base members when the device is in the open position. Therefore, a conventional approach to allow access to interface elements when a mobile communication device, such as a flip phone, is opened may be to duplicate interface elements to be present on both an outer and an inner surface of the device. However, adding more interface elements may increase the cost, size, and/or complexity of a mobile communication device.

BRIEF DESCRIPTION OF THE DRAWINGS

Embodiments will now be described in greater detail with reference to the accompanying diagrams, in which:

FIG. 1C is a perspective view of the mobile communication device of FIG. 1A in a fully opened position;
FIG. 11A is a diagram showing the relative position and movement of the first, second, third and fourth pivots P1, P2, P3, and P4 as the device of FIG. 1A moves from the closed position shown in FIG. 9A to the partially opened position shown in FIG. 9B;
FIG. 11B is a diagram showing the relative position and movement of the first, fourth, fifth and sixth pivots P1, P4, P5, and P6 as the mobile communication device of FIG. 1A moves from the closed position shown in FIG. 9A to the partially opened position shown in FIG. 9B;
FIG. 12A is a diagram showing the relative position and movement of the first, second, third and fourth pivots P1, P2, P3, and P4 as the mobile communication device of FIG. 1A moves from the closed position shown in FIG. 9A to the fully opened position shown in FIG. 9C;
FIG. 12B is a diagram showing the relative position and movement of the first, fourth, fifth and sixth pivots P1, P4, P5, and P6 as the mobile communication device of FIG. 1A moves from the closed position shown in FIG. 9A to the fully opened position shown in FIG. 9C;
FIG. 13A is a side view of a mobile communication device according to a second embodiment in a closed position;
FIG. 13B is a side view of the mobile communication device of FIG. 13A in a partially opened position;
FIG. 13C is a side view of the mobile communication device of FIG. 13A in a fully opened position.

DETAILED DESCRIPTION

Figure 1A:
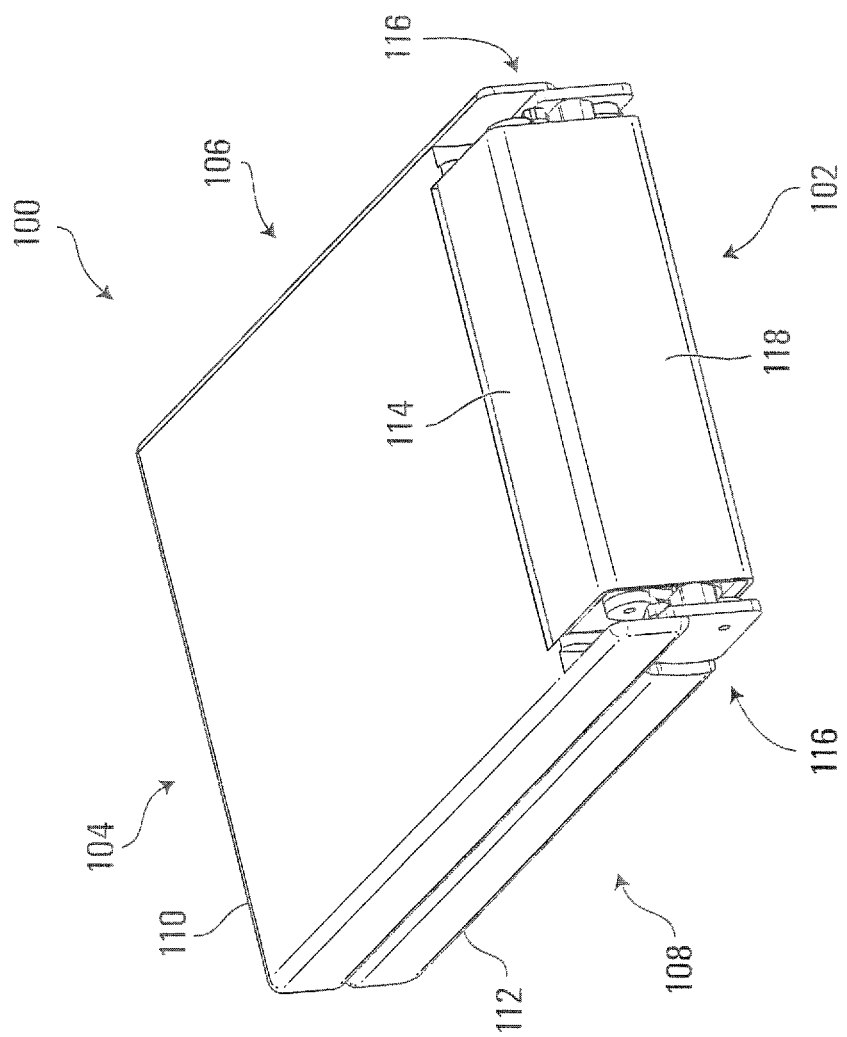
FIG. 1A is a perspective view of a mobile communication device according to a first embodiment in a closed position.

According to some embodiments, the present disclosure provides a mobile communication device including a first or lid member having a first surface, a second or base member having a second surface, a rotatable member having a third surface, and a linkage mechanism which hingeably couples the first member, the second member and the rotatable member such that the device has a closed position and an opened position. The first surface and the second surface are inaccessible when the device is in the closed position and the first surface and the second surface are accessible when the device is in the opened position. As will be described in further detail below, the rotatable member has a first rotational state such that the third surface is accessible when the device is in the closed position, and a second rotational state such that the third surface is positioned between and concurrently viewable with the first surface and the second surface when the device is in the opened position. The linkage mechanism is configured to actuate movement of the rotatable member from the first rotational state to the second rotational state responsive to movement of the device from the closed position to the open position. Also, the linkage mechanism is further configured to actuate movement of the rotatable member from the second rotational state to the first rotational state responsive to movement of the device from the open position to the closed position.

For simplicity and consistency, the surfaces of the lid and base members which are inside and inaccessible in the closed position are referred to herein as "inner" surfaces even when the device is in the opened position and the inner surfaces are accessible. Surfaces of the lid and base members which are accessible when the device is in both the closed position and the opened position will be referred to herein as "outer" surfaces.

As mentioned above, a mobile communication device may be provided with an interface surface that may include interface elements. The term "interface elements" as used herein may include one or more interactive user interfaces such as a touch screen, keys, a control surface, etc. No particular one type of possible elements described above is required to constitute interface elements as referred to herein. An interface surface may also include a graphical display. A graphical display could also be provided in combination with interface elements or alone on an interface surface as described above. It is to be understood that the term "interface elements" includes a sole graphical interface on an interface surface and embodiments are not limited to interface surfaces which accept input from a user.

Interface elements may be provided on an outer surface located on a linked end of the device. This position of the interface elements may commonly be referred to as the "pager position". Alternatively, interface elements may be located on another outer surface such as the top or bottom of the device. The top of the device refers herein to an outer surface of the device which is opposite to the base member. The bottom of the device herein refers to an outer surface opposite to the top of the device.

As previously mentioned, in conventional mobile devices, interface elements on the outer surface may not be easily accessible when the device is in the open position. Therefore, as described in detail below, it may be desirable to design the device such that the same interface elements may be used when the device is in both the opened and closed positions.

In some embodiments, a rotatable member may be an elongated, generally rectangular prism shape, although embodiments are not limited to rectangular prism shaped rotatable members. When an elongated rectangular prism shaped rotatable member is rotated, rotating edges of the rotatable member require a clearance distance between the lid and base members which is greater than the width of any of the sides of the rotatable member. This clearance requirement is due to the fact that the distance between any two diagonally opposite edges may be greater than a width of the rotatable member. However, when the device is in the opened position, the rotatable member may only require a space between the lid and base members which is as wide as the rotatable member, and more specifically, the width of the interface surface. Therefore, due to the clearance required for rotating the rotatable member, at least one gap between the rotatable member and the lid and base members may be present when the device is in the opened position. Such gaps, if too large, may be unsightly and may become dirty or clogged. Therefore, it may also be desirable to minimize the size of gaps between the edges of the rotatable member and the inner surfaces of the lid and base members of a mobile communication device when the device is in an opened position. In some embodiments, movement of the rotatable member from the first to the second rotational states may include translational movement. The translational movement may include initial translational movement away from the lid and base and subsequent translational movement toward the lid and base members. The rotating corner edges of the rotatable member may thereby be moved away from the lid and base members as they are rotated and require less distance between the lid and base members for clearance. Reducing the required clearance distance may reduce gaps between the rotatable member and the inner surfaces of the lid and base members when the device is in the opened position. However, it is to be understood that embodiments are not limited to linkage mechanisms which actuate translational movement in addition to rotational movement of a rotatable member.

Figure 1B:
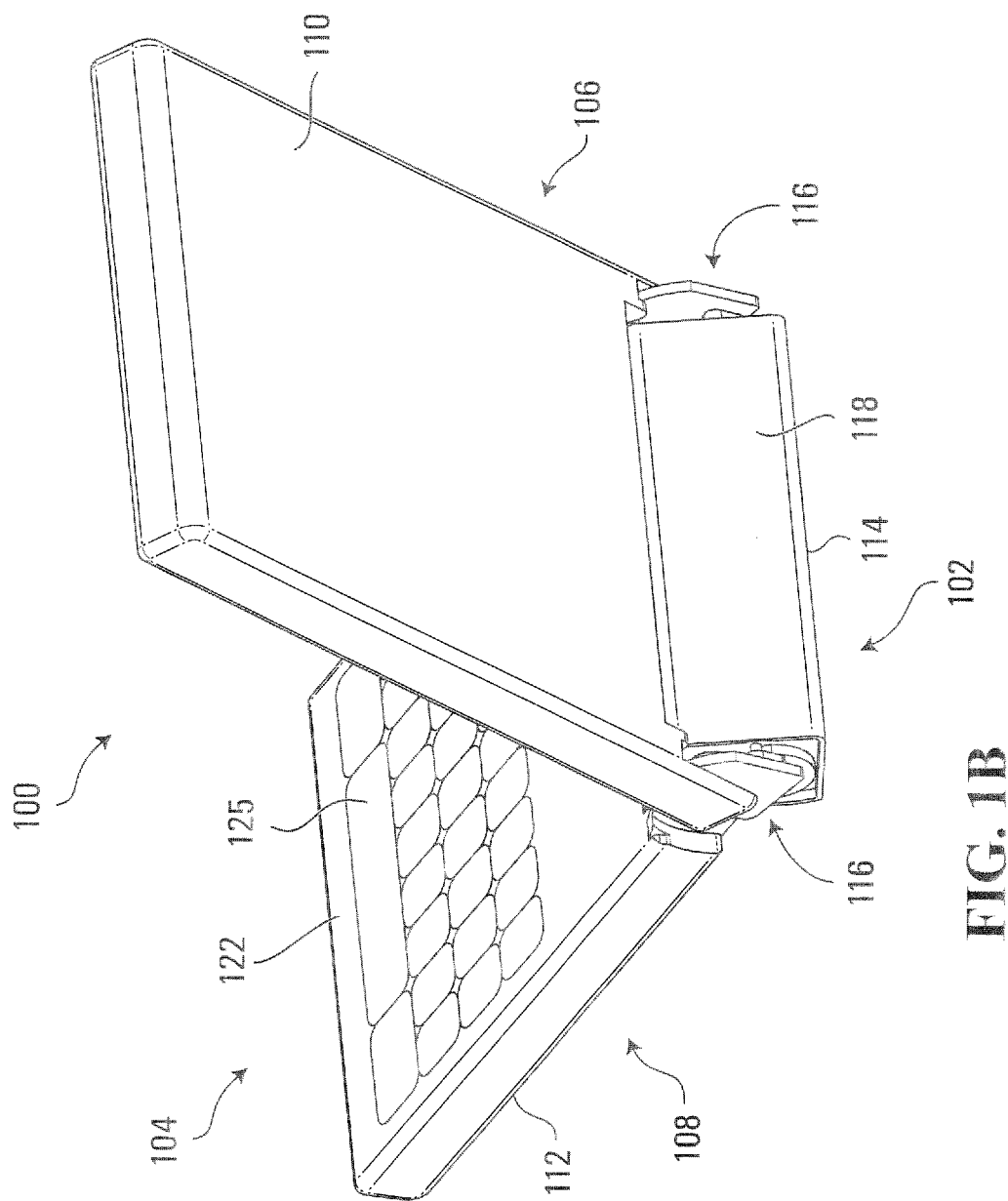
FIG. 1B is a perspective view of the mobile communication device of FIG. 1A in a partially opened position.

FIGS. 1A to 1C show one example embodiment of a flip phone device. Embodiments are not limited to flip phone or handheld devices and some embodiments may be directed to other mobile communication devices such as portable computing devices. FIGS. 1A to 1C are perspective views of a flip phone device 100 in a closed, partially opened, and fully opened position, respectively. The device 100 has a linked end 102, an opposite free end 104, a first device side 106 and a second device side 108. The device 100 includes a first or lid member 110, a second or base member 112, a third or rotatable member 114, and a linkage mechanism 116. The rotatable member 114 includes a third or interface surface 118 which may have interface elements thereon, such as a control surface, a graphical display, one or more keys or a touch screen. The lid and base members 110, 112 have a first or inner lid member surface 120 (shown in FIG. 1C) and a second or inner base member surface 122 (shown in FIGS. 1B and 1C), respectively. In this embodiment, the lid member 110 includes a graphical display 124 on the inner lid member surface 120 and the base member 112 includes a keyboard 125 on the inner base member surface 122.

It is to be understood that embodiments are not limited to mobile communication devices having a graphical display and keyboard exclusively on respective lid and base members. In some embodiments, keys or a keyboard may also be present on the lid member. Similarly, graphical display elements are not limited to the lid member only. Further, the keyboard 125 may be a virtual keyboard provided on a touch screen display (not shown).

In this embodiment, the lid, base and rotatable members 110, 112 and 114 are hingeably coupled by the linkage mechanism 116 toward the linked end 102 of the device 100. The linkage mechanism 116 includes elements which are mirrored at the first and second device sides 106 and 108 near the linked end 102. As will be apparent to a person skilled in the art, embodiments are not limited to linkage mechanisms with mirrored elements on each side of a device. In some embodiments, a linkage mechanism may include elements near or at one side of the device only. Alternatively, the linkage mechanism may be located at another location, such as a central location between the sides of the device.

In the closed position shown in FIG. 1A, the inner lid and base member surfaces 120 and 122 are adjacent to each other. The interface surface 118 is located on the linked end 102, in the "pager position", of the device 100 and may, therefore, be accessible when the device 100 is in the closed position. This position of the rotatable member 114 constitutes a first rotational state. It is to be understood that although the interface surface 118 is shown on the linked end 102 of the device 100 in FIG. 1A, embodiments are not limited to this orientation.

The linkage mechanism 116 enables moving the device from the closed to the fully opened position. As will be discussed in detail below, the linkage mechanism 116 actuates movement of the rotatable member 114 from the first rotational state to a second rotational state in response to movement of the device 100 from the closed to the opened position. The linkage mechanism 116 may also actuate rotation of the rotatable member 114 from the second to the first rotational state in response to movement of the device 100 from the opened position to the closed position.

As the device 100 is moved from the closed position shown in FIG. 1A to the partially opened position shown in FIG. 1B, the lid member 110 is rotated in one direction with respect to the base member 112 such that the inner lid and base member surfaces 120 and 122 are moved apart. The linkage mechanism 116, in response, counter-rotates the rotatable member 114 in the reverse direction towards the second rotational state. As part of the rotation of the rotatable member 114, the linkage mechanism 116 shown in FIGS. 1A to 1C actuates translational movement in the rotatable member 114. As can also be seen in FIG. 1B, the rotatable member 114 is initially moved away from the lid and base members 110 and 112 as part of its movement from the first rotational state. The counter-rotation and translational movement of the rotatable member 114 is actuated by link mechanism 116 in response to movement of the device 100 from the closed position, and will be described in further detail below.

As the device moves from the partially opened position shown in FIG. 1B to the fully opened position shown in FIG. 1C, the lid member 110 continues to rotate with respect to the base member 112. The rotatable member 114 is further counter-rotated. The linkage mechanism 116 also actuates translational movement of the rotatable member 114 back towards the lid and base members 110 and 112. The combined translational and rotational movement brings the rotatable member 114 to the position shown in FIG. 1C.

FIG. 1C shows the device 100 in the fully opened position. In the fully opened position, the inner lid and base member surfaces 120 and 122 are accessible to a user of the device 100. Therefore, the graphical display 124 and the keyboard 125 on the respective inner lid and base member surfaces 120 and 122 may be accessible when the device 100 is in the opened position. In this embodiment, as shown in FIG. 1C, when the device 100 is in the fully opened position, the interface surface 118 is positioned between and concurrently viewable with the inner lid and base member surfaces 120 and 122. This constitutes the second rotational state of the rotatable member 114 in this embodiment. Therefore, interface elements on the interface surface 118 may be conveniently accessed by the user when the device 100 is in the opened position. This position of the rotatable member 114 constitutes the second rotational state.

In this embodiment, in the second rotational state, the interface surface 118 is aligned and flush with the inner lid member surface 120. It is to be understood that in some embodiments the interface surface of a rotatable member may not be aligned with the inner surface, but may simply be in a position such that the interface surface faces the same general direction as the inner surface of the lid member or an inner surface of the base member. Alternatively, the interface surface could be aligned with an inner surface of a base member in some embodiments.

In some embodiments, when the device 100 is in the fully opened position, the lid and the base members 110 and 112 may be at an angle between 160 and 170 degrees with respect to one another, although embodiments are not limited to such angles. In moving from the closed to the open position, the lid member 110 may rotate approximately 165 degrees with respect to the base member 112. In that case, the linkage mechanism 116 may counter-rotate the rotatable member 114 by approximately 105 degrees to align with the inner lid member surface 120 in the open position. A person skilled in the art will appreciate that various configurations of the lid and base members may be implemented for the opened position of the device, and embodiments are not limited to any particular angle or rotation of the lid member with respect to the base member.

In the fully opened position, a base/rotatable member gap 130 is present between the base member 112 and the rotatable member 114, and a lid/rotatable member gap 131 is present between the lid member 110 and the rotatable member 114. The translational movement of the rotatable member 114, initially away from the lid and base members 110 and 112, and then back toward the lid and base members 110 and 112, during its rotation may enable minimizing the size of the base/rotatable member gap 130 and the lid/rotatable member gap 131 when the device 100 is in the opened position. The movement of the rotatable member 118 and the resulting base/rotatable member gap 130 and lid/rotatable member gap 131 will be discussed in more detail below.

The linkage mechanism 116 also actuates movement of the rotatable member 114 from the second rotational state to the first rotational state in response to movement of the device 100 from the fully opened to the closed position by essentially reversing the movements described above.

The device 100, and in particular the linkage mechanism 116, will now be described in more detail with reference to FIGS. 2 to 12B. Again, it is to be understood that the linkage mechanism 116 is only one example of a linkage mechanism that may actuate rotation of a rotatable member including an interface surface, and embodiments are not limited to the devices including the linkage mechanism 116.

In the remaining description of the device 100, the direction extending perpendicularly away from the base member 112 and toward the lid member 110, when the device 100 is in the closed position, will be referred to as the upward direction. Conversely, the opposite direction will be referred to as the downward direction. The direction extending from the linked end 102 toward the free end 104 of the device 100, when the device 100 is in the closed position, will be referred to as the forward direction. Conversely, the opposite direction will be referred to as the backward direction. The upward, downward, forward and backward directions are referenced to the base member 112 which is shown as remaining stationary relative to other elements of the device 100 in the figures. These reference directions are for ease of description and do not require any particular orientation of the elements of the device 100 including the base member 112.

The linkage mechanism 116 includes a system of linkages intermediate of, and pivotably connected to, the lid, base, and rotatable members 110, 112, and 114. The linkage mechanism includes elements of the lid member 110, the base member 112 and the rotatable member 114. The linkage mechanism 116 further includes two additional link members, although other embodiments may comprise more or less additional link members. Specifically, the linkage mechanism 116 includes a base link member 132 (described below and shown in FIG. 4) and a lid link member 134 (described below and shown in FIG. 5) which are mirrored on each of the first and second device sides 106 and 108. The lid member 110, the base member 112, the rotatable member 114, the base links 132 and the lid links 134 are described individually, and in greater detail, with reference to FIGS. 2 to 6 respectively.

Figure 2:
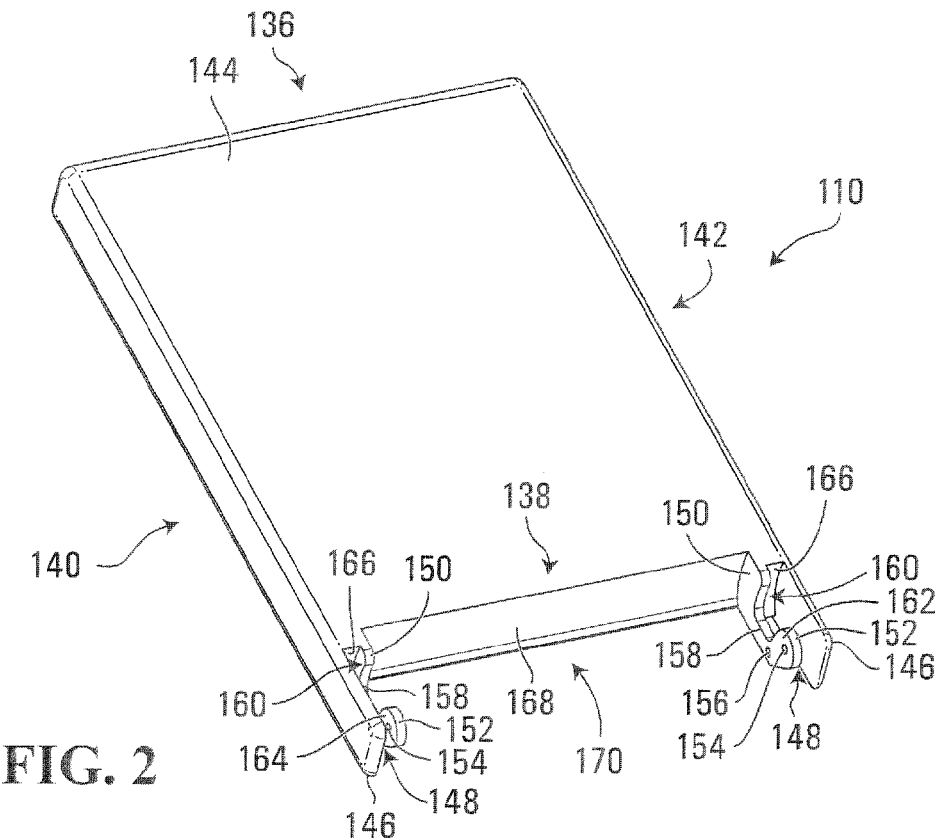
FIG. 2 is a perspective view of a lid member of the mobile communication device of FIG. 1A.

FIG. 2 is a perspective view of the lid member 110 of device 100 (as shown in FIGS. 1A to 1C). The lid member 110 has a first lid member end 136, an opposite second lid member end 138, a first lid member side 140 and an opposite second lid member side 142. The lid member 110 has a lid member outer surface 144, and the inner lid member surface 120 having the graphical display 124 (shown in FIG. 1C). In this embodiment, the lid member 110 includes cover plates 146 and lid hinge plates 148. The cover plates 146 each depend backward from the second lid member end 138 and substantially parallel to the lid hinge plates 148 at the respective side 140 and 142. The lid hinge plates 148 each depend from the second lid member end 138 toward the linked end of the device 100 and are disposed inward from a respective cover plate 146. The lid cover plates 146 are uniformly the same height as the first and second lid member sides 140 and 142 and extend farther than the lid hinge plates 148.

Each lid hinge plate 148 is generally U-shaped with a first arm 150 attached to the second lid member end 138 and a second arm 152 which is angled away from the second lid member end 138. The second arm 152 includes first and second lid member pivot holes 154 and 156. The first lid member pivot hole 154 is above the second lid member pivot hole 156 and is further away from the second lid member end 138. A lid hinge plate recess 158 is defined between the first and second arms 150 and 152 of each lid hinge plate 148. The lid hinge plates 148 have respective inner and outer lid hinge plate surfaces 162 and 164 which are substantially flat.

In this embodiment, base link accommodation gaps 160 are present between each cover plate 146 and the respective lid hinge plate 148. A lid member/base link clearance surface 166 defines an end wall of each base link accommodation gap 160. Each lid member/base link clearance surface 166 is concavely curved. A lid/rotatable member clearance surface 168 at the second lid member end 138 extends between the lid hinge plates 148 and is concavely curved. The lid/rotatable member clearance surface 168 and the lid hinge plates 148 together define a lid/rotatable member clearance space 170 which can accommodate the rotatable member 114 (shown in FIGS. 1A to 1C) and the lid links 134 (shown in FIG. 5) between the lid hinge plates 148, as will be described in further detail below.

Figure 3:
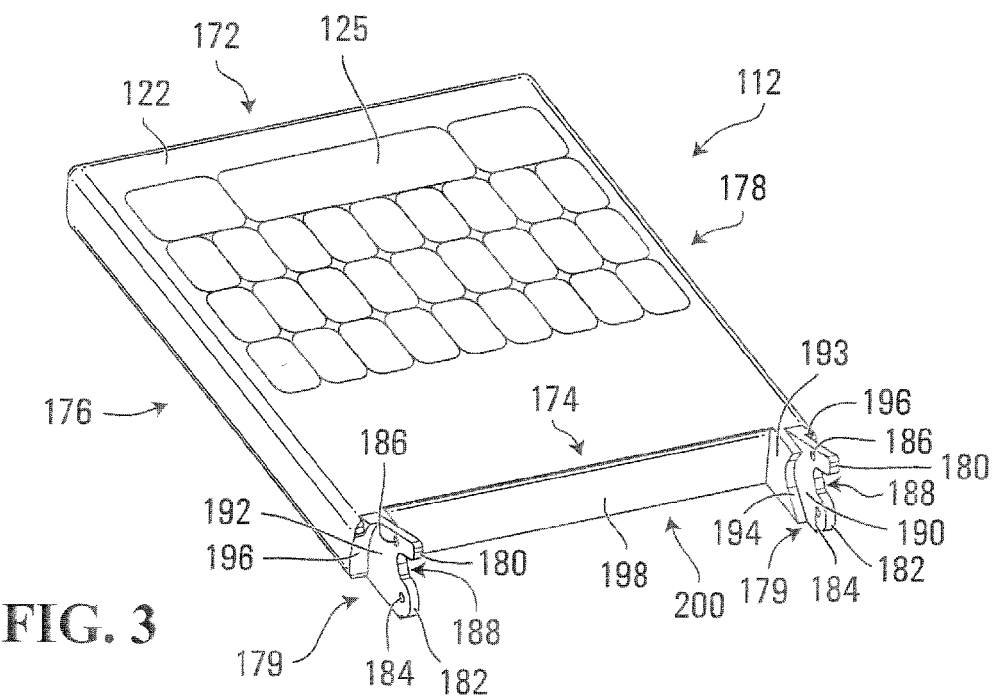
FIG. 3 is a perspective view of a base member of the mobile communication device of FIG. 1A.

FIG. 3 is a perspective view of the base member 112 of device 100 (as shown in FIGS. 1A to 1C). The base member 112 has a first base member end 172, an opposite second base member end 174, a first base member side 176 and an opposite second base member side 178. In this embodiment, the base member 112 includes two base hinge plates 179 which each depend backward from the second base member end 174 near a respective first or second base member side 176 and 178.

Turning again to FIG. 3, each base hinge plate 179 of this embodiment includes an upper arm 180 and a lower arm 182 which each extend generally away from the second base member end 174. The upper arm 180 is angled upward and away from the second base member end 174 and the lower arm 182 is substantially rounded. The base hinge plate 179 includes first and second base member pivot holes 184 and 186. The first base member pivot hole 184 is disposed in the lower arm 182 and the second base member pivot hole 186 is disposed above the first base member pivot hole 184 and is closer to the second base member end 174. A base hinge plate recess 188 is defined between the upper and lower arms 180 and 182 of each hinge plate 179.

The base hinge plates 179 have respective inner and outer base hinge plate surfaces 190 and 192 which are substantially flat. The base hinge plates 179 each further include a raised surface 193 which is raised from the inner base hinge plate surface 190. The raised surface 193 extends from the second base member end 174 and is partially bounded by a concavely curved edge surface 194 which is shaped to provide clearance for the lid hinge plate 148.

In this embodiment, a side base clearance surface 196 extends from each base hinge plate 179 to the respective first or second base member side 176 and 178. A base/rotatable member clearance surface 198 extends between base hinge plates 179, is concavely curved and provides clearance for the rotational and translational movement of the rotatable member 114 (as shown in FIGS. 1A to 1C) as the device 100 is opened or closed. The base/rotatable member clearance surface 198 and the base hinge plates 179 together define a base/rotatable member clearance space 200 which can accommodate the rotatable member 114 (shown in FIGS. 1A to 1C), the lid links 134 (shown in FIG. 5), and the lid hinge plates 148 (shown in FIG. 2), as described in further detail below.

Figure 4:
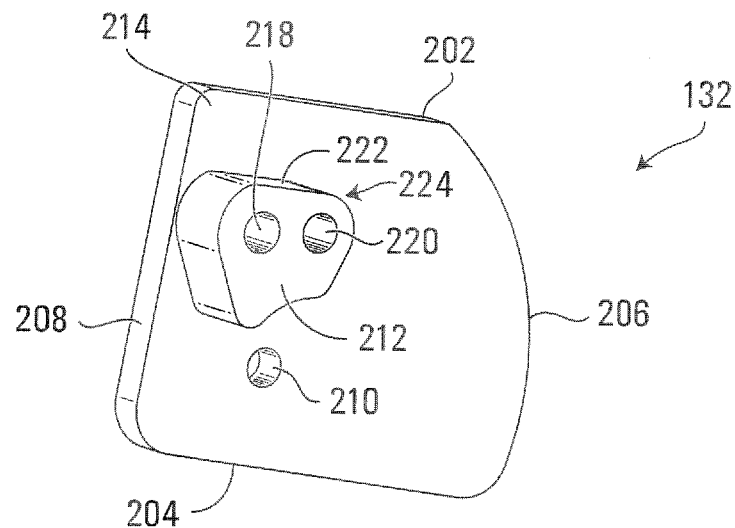
FIG. 4 is a perspective view of a base link member of the mobile communication device of FIG. 1A.

FIG. 4 is a perspective view of the base links 132 of the device 100. In this embodiment, the base link 132 includes an upper edge 202, a lower edge 204, a front edge 206, and a back edge 208. The base link 132 has an inner base link surface 214 and an opposite outer base link surface 216 (shown in FIG. 8C) which are both substantially flat. The upper, lower, and back edges 202, 204, and 208 are each substantially straight. The front edge 206 is convexly curved, and the side base clearance surface 196 of the base member 112 is shaped to provide clearance for the front edge 206 of the base link 132.

The base link 132 further includes a first base link pivot hole 210 and a pivot extension 212. The pivot extension 212 depends substantially perpendicularly away from the inner base link surface 214 near the back edge 208 and above the first base link pivot hole 210. The pivot extension 212 includes second and third base link pivot holes 218 and 220. The pivot extension 212 extends a distance away from the inner base link surface 214 and is approximately the combined thicknesses of the base hinge plate 179 (shown in FIG. 3) and the lid hinge plate 148 (shown in FIG. 2). The pivot extension 212 is bounded by an extension edge surface 222 which extends around and defines a shape of the pivot extension 212. The pivot extension 212 has a front end 224 which is shaped complimentary to both the base hinge plate recess 188 (shown in FIG. 3) and the lid hinge plate recess 158 (shown in FIG. 2).

The base link accommodation gaps 160 of the lid link 110 (shown in FIG. 2) are at least as wide as the combined thickness of a respective base link 132 and base hinge plate 179 (shown in FIG. 3).

Figure 5:
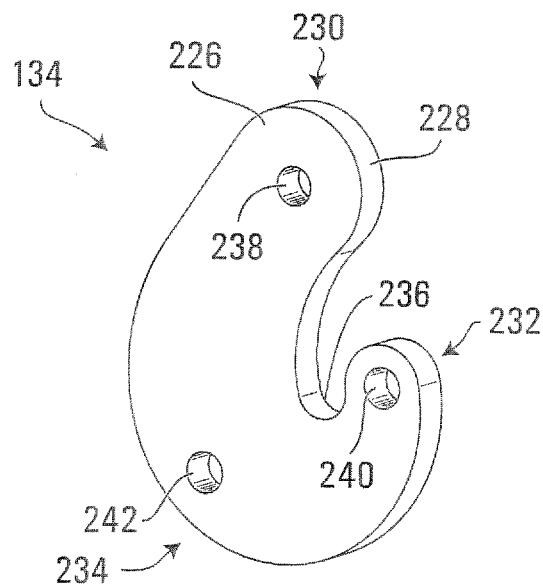
FIG. 5 is a perspective view of a lid link member of the mobile communication device of FIG. 1A.
Figure 7:
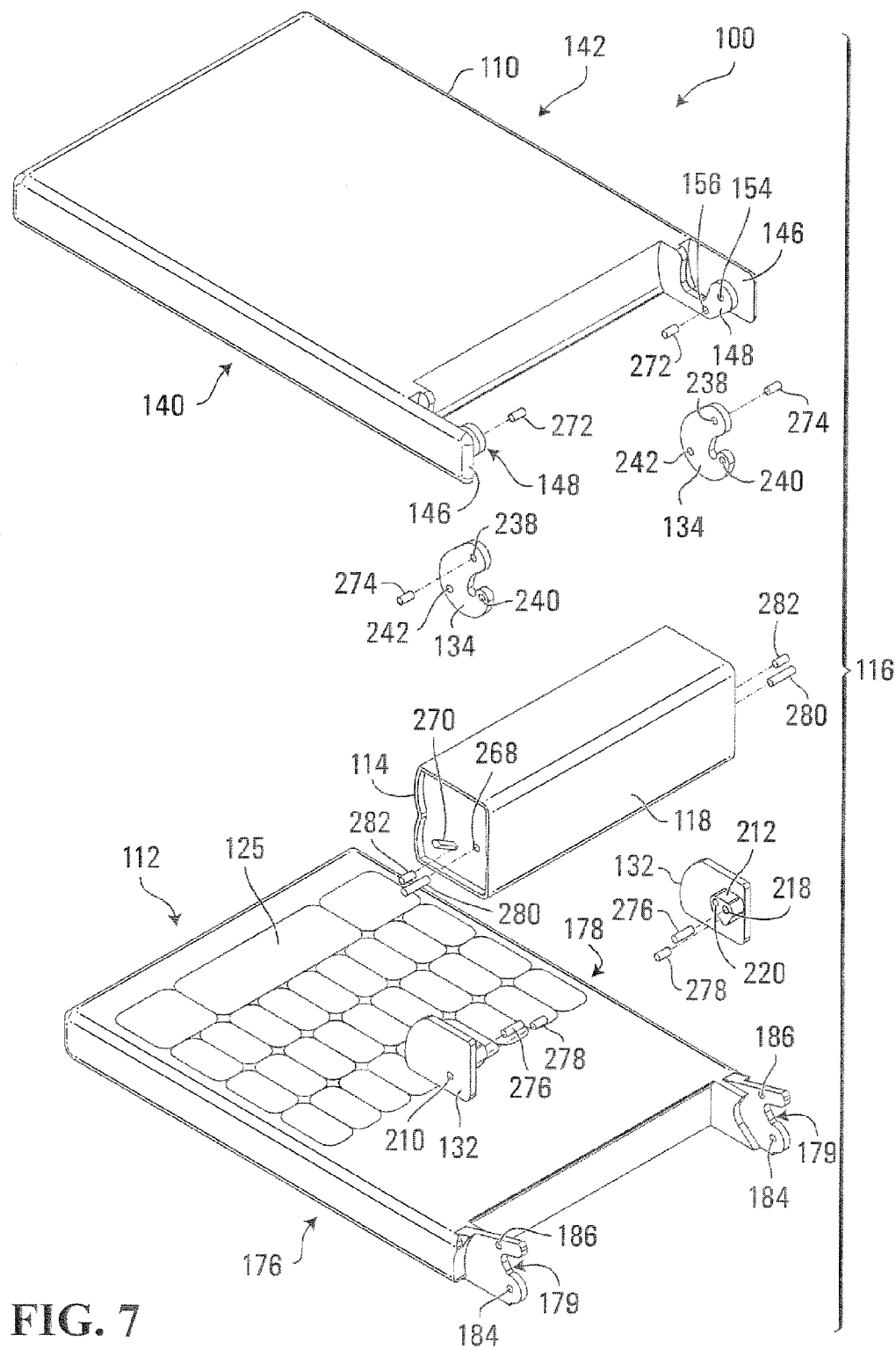
FIG. 7 is an exploded perspective view of the mobile communication device of FIG. 1A.

FIG. 5 is a perspective view of the lid link 134 of device 100 (as shown in FIG. 7). The lid link 134 has an outer lid link surface 226 and an opposite inner lid link surface (not shown) which are both substantially flat. In this embodiment, the lid link includes a continuous curved outer edge 228 which defines a mirror-image J-shape having a long arm 230, a short arm 232 and a curved section 234 between the long arm 230 and the short arm 232. A lid link recess 236 is defined between the long and short arms 230 and 232. The lid link 134 further includes first and second lid link pivot holes 238 and 240 in the long arm 230 and the short arm 232 respectively. A rotatable member drive-pin hole 242 is provided in the curved section 234.

Figure 6:
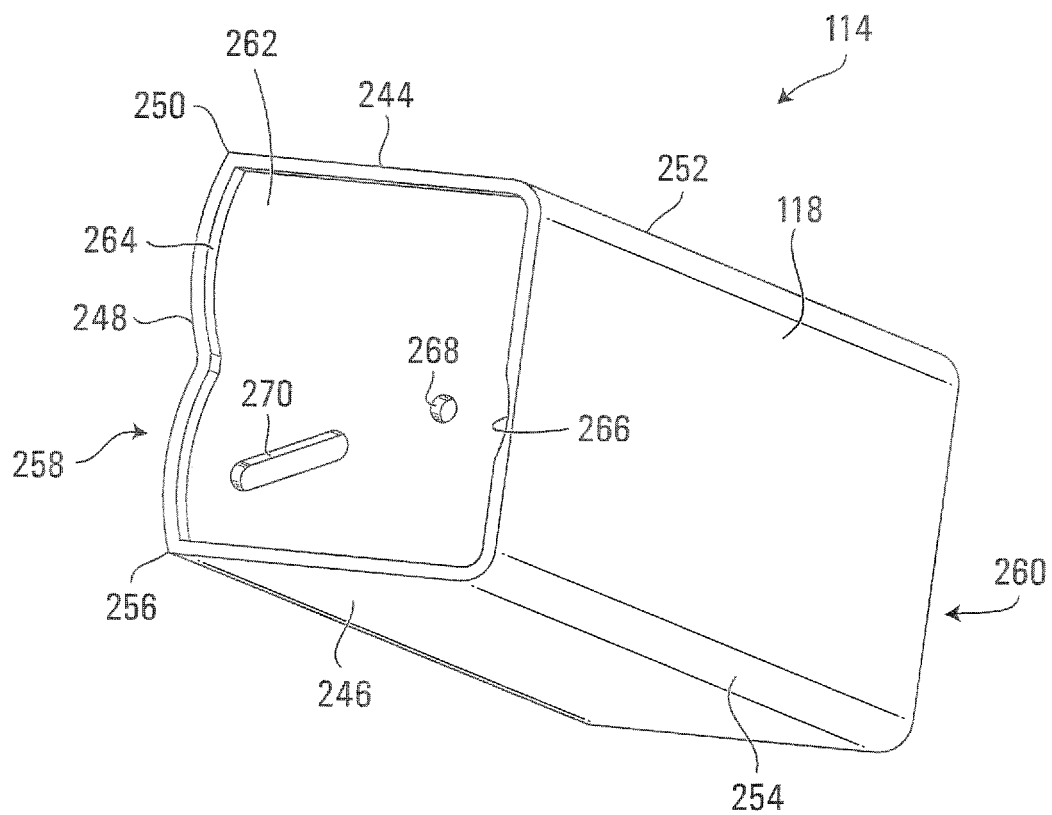
FIG. 6 is a perspective view of a rotatable member of the mobile communication device of FIG. 1A.

FIG. 6 is a perspective view of the rotatable member 114 of device 100 (as shown in FIG. 2). The rotatable member 114 includes a first wall surface 244, a second wall surface 246, a third wall surface 248, and the interface surface 118. In this embodiment, the first and second wall surfaces 244 and 246, and the interface surface 118 are substantially flat and the third wall surface 248 has a slightly M-shaped profile. The first and third wall surfaces 244 and 248 of the rotatable member meet at a first corner edge 250. The first wall surface 244 and the interface surface 118 meet at a second corner edge 252. The interface surface 118 and the second wall surface 246 meet at a third corner edge 254. The second and third wall surfaces 246 and 248 meet at a fourth corner edge 256.

The rotatable member 114 has a first side 258 and an opposite second side 260. In this embodiment, a side surface 262 is slightly recessed inward from side 258. The rotatable member includes a similar opposite side surface (not shown). A recess wall 264 extends around the edge of side surface 262. The recess wall's height is approximately equal to the thickness of the lid link 134 (shown in FIG. 5). A groove 266, which is concavely curved, is defined in the recess wall 264 opposite from the interface surface to accommodate the lid link 134 (shown in FIG. 5).

The distance between diagonally opposite first and third corner edges 250 and 254, or diagonally opposite second and fourth corner edges 252 and 256 of the rotatable member 114 is greater than the width of any wall surface 244, 246, 248 or the interface surface 118 of the rotatable member 114. Therefore, the clearance required for rotating the rotatable member 114 is greater than the width of any one of the wall surfaces 244, 246 and 248 and the interface surface 118 of the rotatable member 114.

The rotatable member 114 further includes a rotatable member pivot hole 268 and a drive slot 270. The rotatable member pivot hole 268 is located approximately midway between the first and second wall surfaces 244 and 246 and adjacent to the groove 266. The drive slot 270 is angled toward the fourth corner edge 256 and is approximately linearly in line with the rotatable member pivot hole 268. Although only the side surface 262 of the rotatable member 114 is shown in FIG. 6, it is to be understood that the rotatable member pivot hole 268 and drive slot 270 are mirrored on the opposite side surface of the rotatable member 114 in this embodiment, although embodiments are not so limited. Again, it is to be understood that some embodiments may only include linkage elements on one side of the device 100.

FIG. 7 is an exploded perspective view of the device 100. FIG. 7 shows the elements of the linkage mechanism 116 described with reference to FIGS. 2 to 6. FIG. 7 shows the lid member 110, the base member 112, the rotatable member 114, the base links 132, and the lid links 134.

First, second, third, fourth and fifth pivot pins 272, 274, 276, 278, and 280 and drive-pin 282 are also shown in FIG. 7. In this embodiment, the first and second lid member pivot holes 154 and 156 are shaped to receive the second and first pivot pins 274 and 272 respectively. The first and second base member pivot holes 184 and 186 are shaped to receive the fourth and first pivot pins 278 and 272 respectively. The first, second, and third base link pivot holes 210, 218 and 220 are each shaped to receive the fourth, fifth, and third pivot pins 278, 280 and 276 respectively. The first and second lid link pivot holes 238 and 240 and the rotatable member drive-pin hole 242 of the lid link 134 are shaped to receive the second and third pivot pins 274 and 276 and the drive-pin 282 respectively. The rotatable member pivot hole 268 is shaped to receive the fifth pivot pin 280 and the drive slot 270 is shaped to receive the drive-pin 282.

The size, shape, and features of the elements of the linkage mechanism 116 described with respect to FIGS. 2 to 7 are not limited to the specific designs described herein. One skilled in the art will appreciate that elements of a linkage mechanism may be sized and shaped differently depending on implementation specific considerations. For example, some or all elements could be designed as simple bar linkages between pivot holes. In addition, other linkage systems may perform similar functions without departing from the scope of some embodiments.

The arrangement of the elements of the device 100, including the linkage mechanism 116 will now be described with reference to FIGS. 7 to 9C.

The elements of each side/half of the hinge mechanism 116 are arranged adjacent to each other in the following order, starting from the respective first and second device sides 106 and 108 and moving inward: the cover plate 146; the base link 132; the base hinge plate 179; the lid hinge plate 148; and then the lid link 134. The rotatable member 114 sits between the two lid links 134. The pivot extension 212 of the base link 132 extends crosswise past the lid and base hinge plates 148 and 179 to sit adjacent to the lid link 134. The cover plates 146 may hide or partially hide some elements of the linkage mechanism 116 from view.

For clarity, side views of the elements of linkage mechanism 116 are shown in FIGS. 8A to 8E in a rotational orientation equivalent to the closed position of the device 100 shown in FIG. 1A. The elements are then shown combined in FIG. 9A to 9C. In FIGS. 8A to 9C, distinct dotted lines are used for each of the elements shown in FIGS. 8A to 8E to show the respective elements, or parts of elements, which are behind other elements.

Figure 8A:
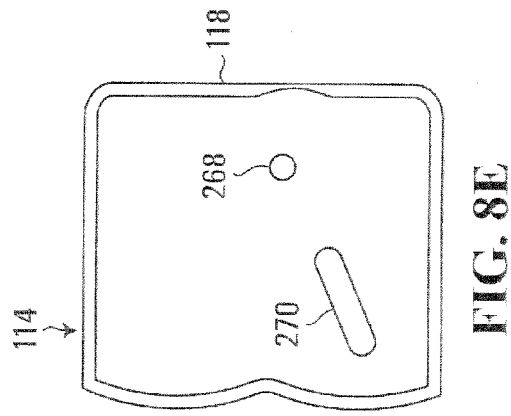
FIG. 8A is a partial cutaway side view of the lid member of FIG. 2 with a lid cover plate cutaway.
Figure 8B:
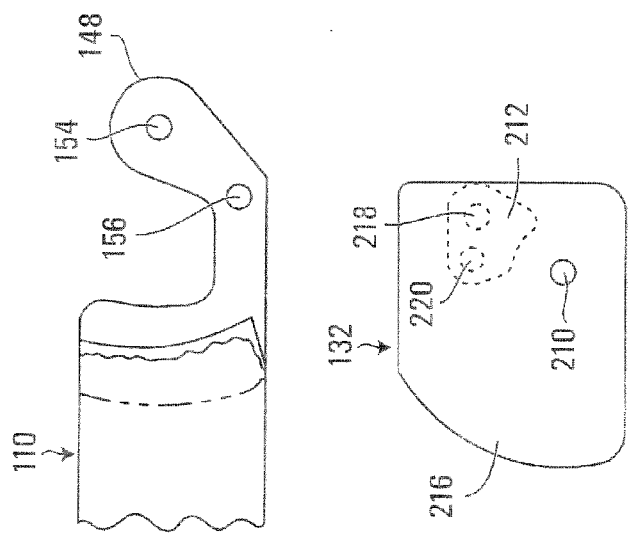
FIG. 8B is a partial cutaway side view of the base member of FIG. 3.
Figure 8C:
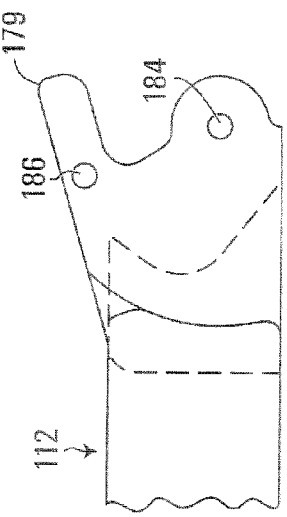
FIG. 8C is a side view of the base link member of FIG. 4.
Figure 8D:
FIG. 8D is a side view of the lid link member of FIG. 5.
Figure 8E:
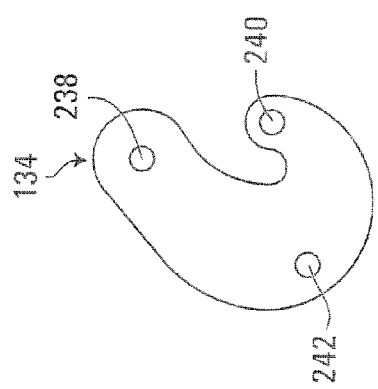
FIG. 8E is a side view of the rotatable member of FIG. 6.

FIG. 8A is a partial cutaway side view of the lid member 110 including lid hinge plate 148 and the first and second lid member pivot holes 154 and 156. The lid cover plate 146 (shown in FIG. 2) of the lid member 110 is cut away in FIG. 8A. FIG. 8B is a partial side view of the base member 112 including base hinge plate 179 and the first and second base member pivot holes 184 and 186. FIG. 8C is a side view of the base link 132 including the first, second, and third pivot holes 210, 218 and 220, the pivot extension 212 and the outer base link surface 216. FIG. 8D is a side view of the lid link 134 including the first and second lid link pivot holes 238 and 240 and the rotatable member drive-pin hole 242. FIG. 8E is a side view of the rotatable member 114 including the interface surface 118, the rotatable member pivot hole 268 and the drive slot 270.

Figure 9A:
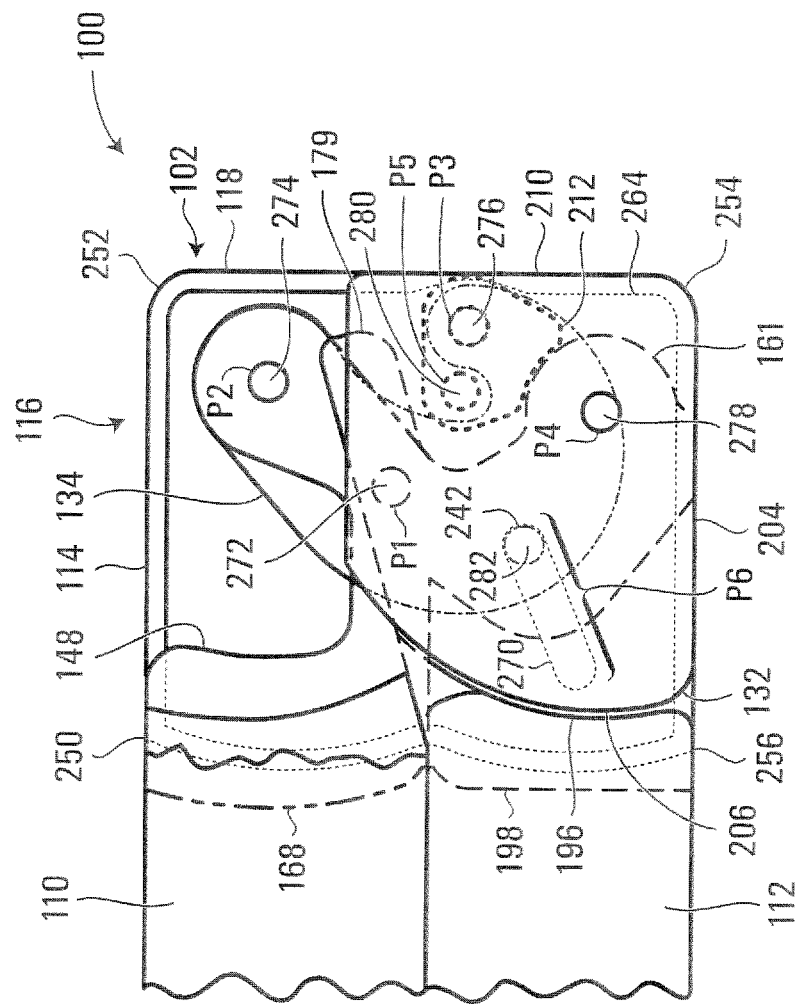
FIG. 9A is a partial cutaway side view of the mobile communication device of FIG. 1A, without the lid cover plate, in the closed position.
Figure 9B:
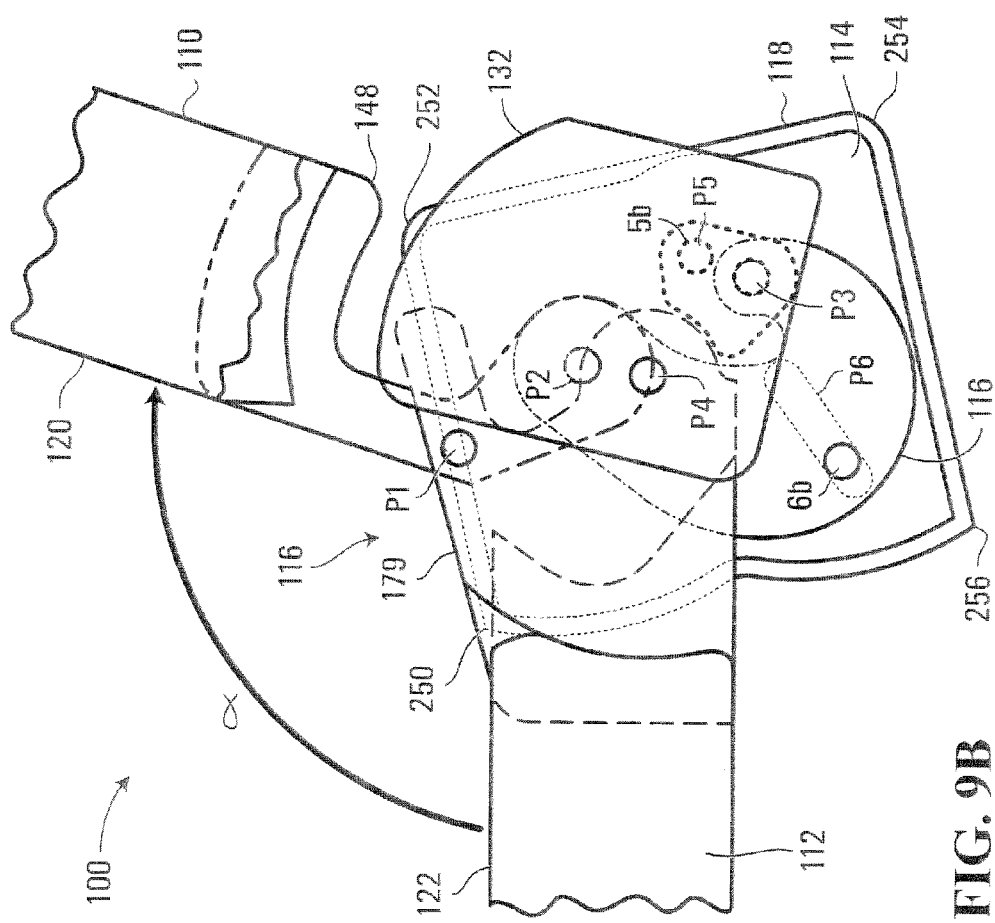
FIG. 9B is a partial cutaway side view of the mobile communication device of FIG. 9A, without the lid cover plate, in the partially opened position.
Figure 9C:
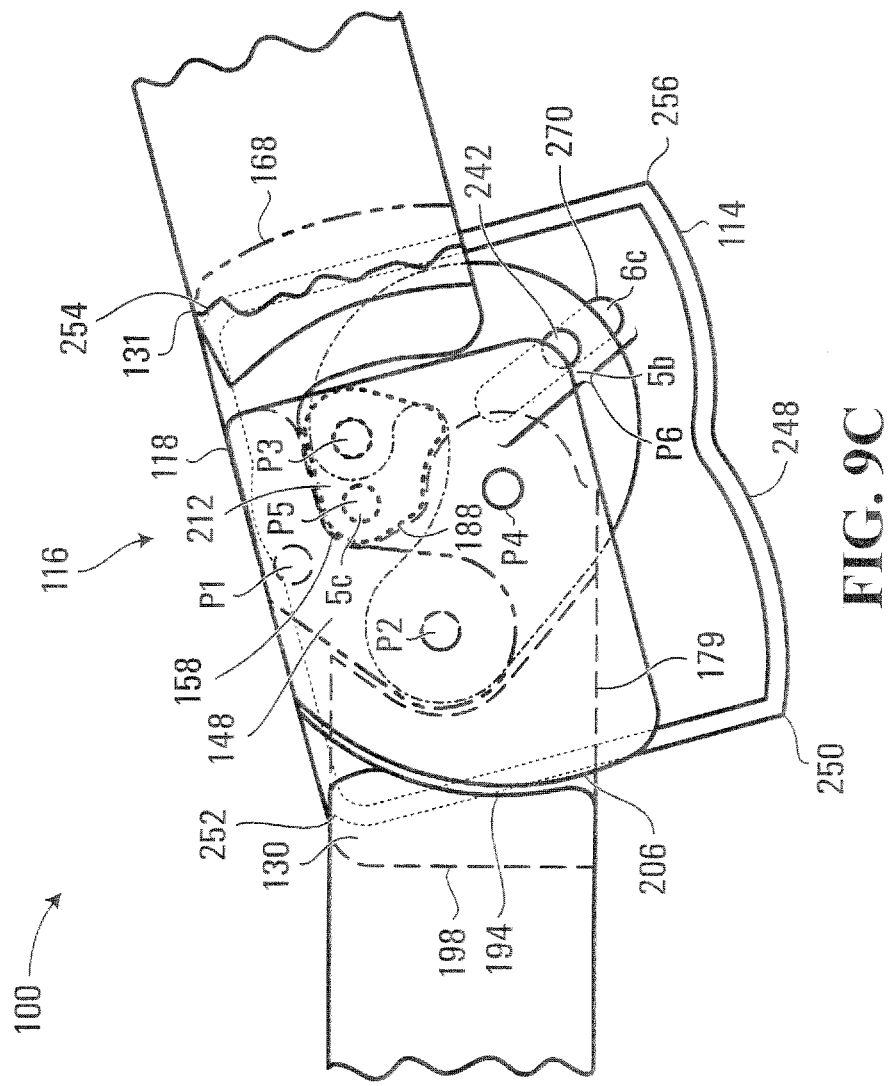
FIG. 9C is a partial cutaway side view of the mobile communication device of FIG. 9A, without the lid cover plate, in the fully opened position.

FIGS. 9A to 9C are each an enlarged partial cutaway side view of the device 100 in the closed, partially opened, and fully opened positions, respectively. The lid cover plate 146 (shown in FIG. 2) of the lid member 110 is cut away in FIGS. 9A to 9C for simplicity and clarity.

Turning to FIG. 9A, the first pivot pin 272 is received in the second lid member pivot hole 156 of the lid hinge plate 148 and the second base member pivot hole 186 of the base hinge plate 179 (shown in FIGS. 8A and 8B respectively). The second lid member pivot hole 156, the second base member pivot hole 186 and the first pivot pin 272 are hereinafter collectively referred to as a first pivot P1. The first pivot P1 rotatably couples the lid hinge plate 148 to the base hinge plate 179.

The second pivot pin 274 is received in the first lid member pivot hole 154 of the lid hinge plate 148 and the first lid link pivot hole 238 (shown in FIGS. 8A and 8D respectively). The first lid member pivot hole 154, the first lid link pivot hole 238 and the second pivot pin 274 are hereinafter collectively referred to as a second pivot P2. The second pivot P2 rotatably couples lid hinge plate 148 to the lid link 134.

The third pivot pin 276 is received in the third base link pivot hole 220 and the second lid link pivot hole 240 (shown in FIGS. 8C and 8D respectively). The third base link pivot hole 220, the second lid link pivot hole 240 and the third pivot pin 276 are hereinafter collectively referred to as a third pivot P3. The third pivot P3 rotatably couples the base link 132 to the lid link 134.

The fourth pivot pin 278 is received in the first base member pivot hole 184 of the base hinge plate 179 and the first base link pivot hole 210 (shown in FIGS. 8B and 8C respectively). The first base member pivot hole 184, the first base link 210 and the fourth pivot pin 278 are hereinafter collectively referred to as a fourth pivot P4. The fourth pivot P4 rotatably couples the base hinge plate 179 to the base link 132.

The fifth pivot pin 280 is received in the second base link pivot hole 218 and the rotatable member pivot hole 268 (shown in FIGS. 8C and 8E respectively). The second base link pivot hole 218, the rotatable member pivot hole 268 and the fifth pivot pin 280 are hereinafter collectively referred to as a fifth pivot P5. The fifth pivot P5 rotatably couples the base link 132 to the rotatable member 114. Lid link recess 236 (shown in FIG. 5) provides clearance for P5.

The drive-pin 282 is received in the rotatable member drive-pin hole 242 of the lid link 134 and the drive slot 270 of the rotatable member 114. The drive-pin 282 can travel within the drive slot 270, but its movement is restricted to travel therein. The rotatable member drive-pin hole 242, the drive slot 270 and the drive-pin 282 are hereinafter collectively referred to as a sixth pivot P6. The sixth pivot P6 rotatably couples the lid link 134 and the rotatable member 114 while allowing the drive-pin 282 to travel in the drive slot 270.

Figure 10:
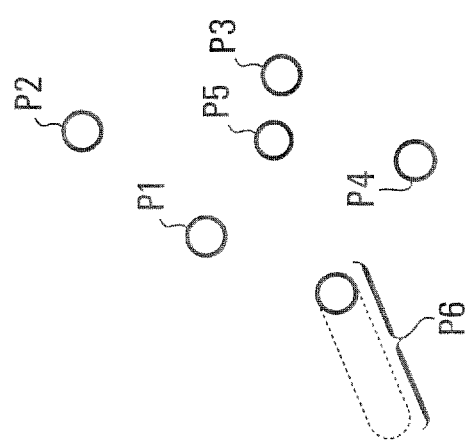
FIG. 10 is a diagram showing the relative position of first, second, third, fourth, fifth and sixth pivots P1, P2, P3, P4, P5 and P6 of the mobile communication device of FIG. 1A in the closed position shown in FIG. 9A.

FIG. 10 is a diagram showing the relative positions of the first, second, third, fourth, fifth and sixth pivots P1, P2, P3, P4, P5 and P6 when the device 100 is in the closed state shown in FIG. 9A.

The elements of the linkage mechanism 116 form a system of linkages which are intermediate to, and pivotably connected to the lid, base, and rotatable members 110, 112, and 114. Turning back to FIG. 9A, each of the lid hinge plate 148, the base hinge plate 179, the base link 132, the lid link 134, and the rotatable member 114 are solid and form solid linkages between pivots that remain a constant length as the device is moved from the closed to the opened position and vice versa. Specifically, the lid hinge plate 148 forms a linkage between the first and second pivots P1 and P2. The base hinge plate 179 forms a linkage between the first and fourth pivots P1 and P4. The base link 132 forms a linkage between each of the third, fourth, and fifth pivots P3, P4, and P5. The lid link forms a linkage between each of the second, third, and sixth pivots P2, P3, and P6. Finally, the rotatable member 114 forms a linkage between the fifth and sixth pivots P5 and P6, although travel of the rotatable member drive-pin hole 242 and the pivot pin 282 is allowed as restricted by the drive slot 270. Each of these linkages maintains a constant length. In this embodiment, the distance between the first pivot P1 and the second pivot P2 is less than the distance between the first pivot P1 and the fourth pivot P4, and the distance between the third pivot P3 and the second pivot P2 is greater than distance between the third pivot P3 and the fourth pivot P4.

The interaction of elements of the device 100, including the linkage mechanism 116, shown in Figures to 9A to 9C will now be described with reference to FIGS. 9A to 12B.

The system of linkages of the linkage mechanism 116 described above actuates the counter-rotation in the rotatable member 114 with respect to the lid member 110 in response to moving the device 100 between the closed to the open positions. The interaction of the elements of the linkage mechanism 114 can be, generally, thought of as a combination of two mechanisms and corresponding motions. A first mechanism includes the linkages between the first, second, third and fourth pivots P1, P2, P3, and P4. A second mechanism includes the linkages between the fifth and sixth pivots P5, P6, and the first mechanism. The movement of the fifth and sixth pivots P5 and P6 defines the movement of the rotatable member 114.

The rotatable member 114 is in the first rotational state in FIG. 9A. As discussed above, interface elements on the interface surface 118 at the linked end 102 ("pager position") of the device 100 are accessible by a user when the device 100 is in the closed position and the rotational member is in the first rotational state.

The movement of the first mechanism (including the first, second, third, and fourth pivots P1, P2, P3, and P4) as the device is moved from the closed position shown in FIG. 9A to the partially opened position shown in FIG. 9B will now be described.

As the device is moved from the closed position shown in FIG. 9A to the partially opened position shown in FIG. 9B, the lid member 110 rotates in a first direction of rotation (clockwise in FIGS. 9A to 9C) with respect to the base member 112 such that the respective inner lid and base member surfaces 120 and 122 move apart. The lid member 110 rotates about the first pivot P1, which connects the lid and base members 110 and 112. The rotation of the lid member 110 drives rotation of the second pivot P2, which is linked to the first pivot P1 by the lid hinge plate 148, about the first pivot P1 in the first direction of rotation.

The linkages between the second, third, and fourth pivots P2, P3 and P4 form a type of "scissor mechanism" where the third pivot P3 is the fulcrum of the scissor mechanism. The rotation of the second pivot P2 about the first pivot P1 initially moves pivot P2 closer to the fourth pivot P4 (which is shown as stationary in FIGS. 9A to 9C) thereby driving movement of the third pivot P3. Movement of the third pivot P3 consists of a rotation about the fourth pivot P4 (to which the third pivot P3 is linked). Therefore, as the second pivot P2 rotates about the first pivot P1, the third pivot P3 also initially rotates about the fourth pivot P4 in the same direction.

FIG. 11A is a diagram showing the relative positions and movement of the first, second, third, and fourth pivots P1, P2, P3, and P4 when the device 100 is moved to the partially opened position. The first and fourth pivots P1 and P4 are shown as remaining stationary in FIG. 11 as they are linked by the base hinge plate 179 which is also shown as stationary in FIGS. 9A to 9C. The dotted line positions 2a and 3a indicate the respective positions of the second and third pivots P2 and P3 when the device 100 is in the closed position (shown in FIG. 9A). The solid line positions 2b and 3b indicate the respective positions of the second and third pivots P2 and P3 when the device 100 is in the partially opened position (shown in FIG. 9B). The movement of the second and third pivots P2 and P3 from the respective positions 2a and 3a to positions 2b and 3b is indicated by the dotted arrows 284 and 286 in FIG. 11A.

The movement of the second mechanism (including the fifth and sixth pivots P5, and P6) as the device is moved from the closed position shown in FIG. 9A to the partially opened position shown in FIG. 9B will now be described.

Turning back to FIGS. 9A and 9B, the fifth pivot P5 is linked to both the third and fourth pivots P3 and P4 via the base link 132. Therefore, the fifth pivot P5 follows a similar initial rotation as the third pivot P3 about the fourth pivot P4. The sixth pivot P6 is linked to the second and third pivots P2 and P3 via the lid link 134 and P6 is also linked to the fifth pivot P5 via the rotatable member 114. As the fifth pivot P5 initially rotates about the fourth pivot P4, the sixth pivot P6 also follows a similar, though transposed, movement. The sixth pivot P6 also travels a greater distance than the fifth pivot P5. As can be seen in FIG. 9B, the initial movement of the fifth and sixth pivots P5 and P6, which are both linked to the rotatable member 114, causes a slight rotation of the rotatable member 114 in a direction of rotation opposite to that of the lid member 110. The initial movement of both the fifth and sixth pivots P5 and P6 also causes translational movement of the rotatable member 114 away from the first pivot P1, and, thus, away from the lid and base members 110 and 112.

FIG. 11B is a diagram showing the relative positions and movement of the first, fourth, fifth and sixth pivots P1, P4, P5, and P6 when the device 100 is moved to the partially opened position. The first and fourth pivots P1 and P4 are shown as remaining stationary in FIG. 12A, as they are linked by the base hinge plate 179 which is shown as stationary in FIGS. 9A to 9C. The dotted line positions 5a and 6a indicate the respective positions of the fifth and sixth pivots P5 and P6 when the device 100 is in the closed position (shown in FIG. 9A). The solid line positions 5b and 6b indicate the respective positions of the fifth and sixth pivots P5 and P6 when the device 100 is in the partially opened position (shown in FIG. 9B). The movement of the fifth and sixth pivots P5 and P6 from the respective positions 5a and 6a to positions 5b and 6b is indicated by the dotted arrows 288 and 290 in FIG. 11B.

The movement of the first mechanism (including the first, second, third, and fourth pivots P1, P2, P3, and P4) as the device is moved from the partially opened position shown in FIG. 9B to the fully opened position shown in FIG. 9C will now be described.

As the device is moved from the partially opened position shown in FIG. 9B to the fully opened position shown in FIG. 9C, the lid member 110 is further rotated about the first pivot P1 in the first direction of rotation. Therefore, the second pivot P2 continues to rotate about the first pivot P1.

Because the distance between the first and second pivots P1 and P2 is less than the distance between the first and fourth pivots P1 and P4, and the distance between the third and second pivots P3 and P2 is greater than distance between the third and fourth pivots P3 and P4, the second pivot P2 can rotate continuously in the first direction of rotation about the first pivot P1. Similarly, the third pivot P3 can rotate continuously about the second pivot P2 but in the direction counter to the first direction of rotation. Once the lid member 110 rotates past a certain angle (approximately the angle alpha shown in FIG. 9B) with respect to the base member 112, the third pivot P3 begins to counter-rotate (counter-clockwise as shown in FIGS. 9B and 9C) about P4. When the device 100 is moved to the fully opened position shown in FIG. 9C, the third pivot P3 is counter-rotated, about the fourth pivot P4, to a position slightly more counter-clockwise than when the device is in the closed position shown in FIG. 9A.

FIG. 12A is a diagram showing the relative positions and movement of the first, second, third, and fourth pivots P1, P2, P3, and P4 when the device 100 moved to the fully opened position. The dotted line positions 2a and 3a indicate the respective positions of the second and third pivots P2 and P3 when the device 100 is in the closed position (shown in FIG. 9A). The dotted line positions 2b and 3b indicate the respective positions of the second and third pivots P2 and P3 when the device 100 is in the partially opened position (shown in FIG. 9B). The solid line positions 2c and 3c indicate the respective positions of the second and third pivots P2 and P3 when the device 100 is in the fully opened position (shown in FIG. 9C). The initial movement of the second and third pivots P2 and P3 from the respective positions 2a and 3a to positions 2b and 3b are indicated by the arrows 284 and 286 (also shown in FIG. 11A). The continued movement of the second and third pivots P2 and P3 from the positions 2b and 3b to positions 2c and 3c is indicated by the dotted arrows 292 and 294 in FIG. 12A.

The movement of the second mechanism (including the fifth and sixth pivots P5, and P6) as the device is moved from the partially opened position shown in FIG. 9B to the fully opened position shown in FIG. 9C will now be described.

As the device is moved from the partially opened position shown in FIG. 9B to the fully opened position shown in FIG. 9C, the fifth pivot P5 follows a similar counter-rotation as the third pivot P3 about the fourth pivot P4. Specifically, the fifth pivot P5 is counter-rotated, about the fourth pivot P4, to a position slightly more counter-clockwise than when the device is in the closed position shown in FIG. 9A. Because the sixth pivot P6 is linked to the rotating second pivot P2, as well as the counter-rotating third and fifth pivots P3 and P5, the sixth pivot P6 moves in an arc from one side of the first pivot P1 (the pivot between the lid and base members 110 and 112) to the other side of the first pivot P1. This continued movement of both the fifth and sixth pivots P5 and P6, as the device 100 moves to the fully opened position, defines a further counter-rotation of the rotatable member 114. The continued movement of both the pivots P5 and P6 also causes translational movement of the rotatable member 114 back toward the first pivot P1, and, thus, back toward the lid and base members 110 and 112.

FIG. 12B is a diagram showing the relative positions and movement of the first, fourth, fifth and sixth pivots P1, P4, P5, and P6 when the device 100 is moved to the fully opened position. The dotted line positions 5a and 6a indicate the respective positions of the fifth and sixth pivots P5 and P6 when the device 100 is in the closed position (shown in FIG. 9A). The dotted line positions 5b and 6b indicate the respective positions of the fifth and sixth pivots P5 and P6 when the device 100 is in the partially opened position (shown in FIG. 9B). The solid line positions 5c and 6c indicate the respective positions of the fifth and sixth pivots P5 and P6 when the device 100 is in the fully opened position (shown in FIG. 9C). The initial movement of the fifth and sixth pivots P5 and P6 from the respective positions 5a and 6a (closed position) to positions 5b and 6b (partially opened position) are indicated by the arrows 288 and 290 (also shown in FIG. 11B). The continued movement of the fifth and sixth pivots P5 and P6 from the positions 2b and 3b (partially opened position) to positions 2c and 3c (fully opened position) is indicated by the dotted arrows 296 and 298 in FIG. 12B.

Turning to FIG. 9C, pivot extension 212 of the base link 132 may act as a physical stop defining the allowable angle between the lid member 110 and the base member 112 when the device 100 is opened. When the device 100 is in the opened position, pivot extension 212 may abut both the base hinge plate recess 188 and the lid hinge plate recess 158 to prevent further rotation of the lid member 110 with respect to the base member 112. In this way, the shape of the base hinge plate 179, the lid hinge plate 148 and pivot extension 212 can be designed to provide a physical stop at the desired angle for the opened position of the device 100.

As described above, the linkage mechanism 116 actuates rotational and translational movement of the rotatable member 114 with respect to the lid and base members 110 and 112. By moving the rotatable member 114 away from the lid and base members 110 and 112 as part of the rotation process, rotation of the first, second, third and fourth corner edges 250, 252, 254 and 256 requiring the greatest clearance occurs away from the lid and the base members 110 and 112. Thus, the clearance distance between the base/rotatable member clearance surface 198 and the lid/rotatable member clearance surface 168 (as shown in FIG. 9C) may be reduced. Reducing the clearance distance as described above may minimize the necessary size of the base/rotatable member gap 130 and the lid/rotatable member gap 131 shown in FIG. 9C.

As mentioned above, the linkage mechanism 116 also actuates movement of the rotatable member 114 from the second rotational state to the first rotational state in response to movement of the device from the fully opened to the closed position. The movements described above with respect to opening the device are essentially reversed when the device is closed.

It is to be understood that embodiments are not limited to mobile communication devices implementing the linkage mechanisms described above. A linkage mechanism need not consist of a series of pivots and linkages, but may also be accomplished by a system of gears or other linkage elements. Also, embodiments are not limited to those having rectangular prism shaped rotatable members as described above. Indeed, any prism form that has corner distances greater than the distances between flat sides could be transposed via a similar method of combined rotation and translation. As a further example, a rotatable member could be cylindrical shaped. A cylindrical shaped rotatable member, having no rotating corners, would not require translational movement to provide clearance for rotation of the member.

In some embodiments a camera may be present on a surface of the rotatable member 114. A camera (not shown) could be provided on the wall surface 244 which is opposite to an interface surface 118. The camera would be hidden when the device 100 is in the closed position, but will face away from inner surfaces 122 and 120 when the device 100 is in the opened position.

Springs or other methods could be used in conjunction with the linkage mechanism 116 to provide a bias force such that device 100 naturally remains in either the opened or closed position in the absence of outside force being applied to device 100.

In some embodiments a linkage mechanism may not actuate translational movement of a rotatable member. In some embodiments, a four-bar linkage may be implemented as a linkage device used to couple together lid, base, and rotatable members of a flip phone device and to actuate rotation of the rotatable member.

An embodiment of a mobile communication device utilizing a four-bar linkage which does not actuate translational movement of a rotational member will now be described with reference to FIGS. 13A to 13C and 14. It is to be understood that FIGS. 13A to 13C and 14 show only an example of a linkage mechanism that may be used in a flip phone device, and other linkage mechanisms may be used in some embodiments.

FIGS. 13A to 13C are each side views of a flip phone device 400 which has a linked device end 402, a free end 404, a side 406, and an opposite side (not shown). The device 400 includes a lid member 408 having a linked lid member end 409 near the linked device end 402 and a base member 410 having a linked base member end 411 near the linked device end 402. The device 400 further includes a rotatable member 412 (shown in FIGS. 13B and 13C) and a linkage mechanism 414. FIGS. 13A to 13C show the device 400 in closed, partially opened, and fully opened positions respectively. The rotatable member 412 includes a third or interface surface 416 which may include interface elements. The linkage mechanism 414 includes a first pivot 418, a second pivot 420 (shown in FIGS. 13A and 13B), a third pivot 422, and a fourth pivot 424, as well as a double hinge linkage bar 426. The rotational member 412 has first and second rotational states similar to those described above with reference to the device 100 (shown in FIGS. 1A to 13B).

Figure 14:
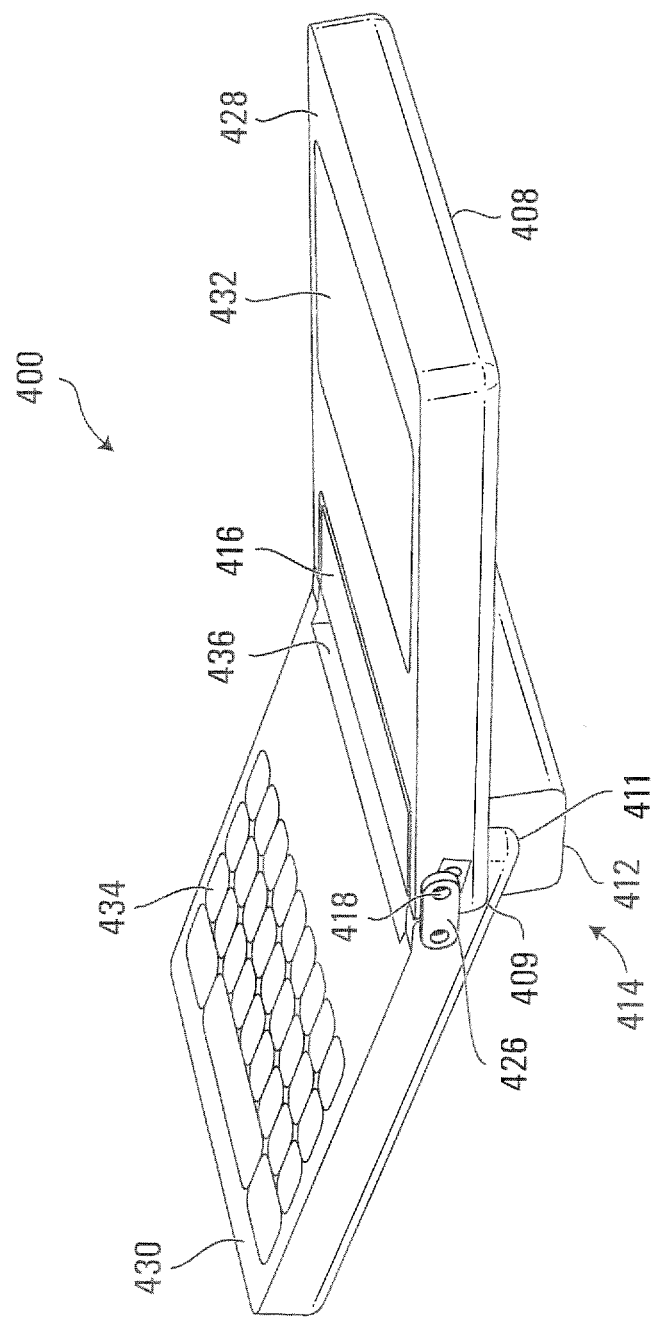
FIG. 14 is a perspective view of the mobile communication device of FIG. 13A in the fully opened position.

FIG. 14 is a perspective view of the device 400 in the opened position. As seen in FIG. 14, the lid and base members 408 and 410 have respective first and second or inner lid and base member surfaces 428 and 430. A graphical display 432 is on the inner lid member surface 428 and a keyboard 434 is on the inner base member surface 430. A gap 436 is present between the base member 410 and the rotatable member 412 when the device is in the opened position.

It is to be understood that the elements of the linkage mechanism 414 may be mirrored on the opposite side of the device 400, although, as explained above, embodiments are not limited to linkage mechanisms which include mirrored elements at or near both sides of a device.

Turning back to FIG. 13A, the linkage mechanism 414 hingeably couples the lid, base and rotatable members 408, 410, and 412. Specifically, the first pivot 418 is a rotatable coupling between the lid member 408 and double hinge linkage bar 426. The second pivot 420 is a rotatable coupling between the lid member 408 and the rotatable member 412. The third pivot 422 is a rotatable coupling between the base member 410 and the double hinge linkage bar 426. The fourth pivot 424 is a rotatable coupling between the base member 410 and the rotatable member 412.

With reference to the device 400 in the closed position shown in FIG. 13A, second pivot 420 and the fourth pivot 424 are each located near the linked device end 402 on the respective lid and base members 408 and 410. The first pivot 418 is located farther from the linked device end 402 than the second pivot 420 on the lid member 408. The third pivot 422 is located farther from the linked device end 402 than the second pivot 424 on the base member 410.

In this embodiment, the lid, base, and rotatable members 408, 410, and 412 and the linkage bar 426 are solid and form solid links between pivots that remain a constant length as the device is moved from the closed to the opened position. Specifically, a first linkage is formed by the lid member 408 between the pivots 418 and 420. A second linkage is formed by the base member 410 between the pivots 422 and 424. A third linkage is formed by the rotatable member 412 between the pivots 420 and 424. A fourth linkage is formed by double hinge linkage bar 426 between the pivots 418 and 422. This hinge/pivot arrangement forms a four-bar linkage.

Turning now to FIG. 13A, the device 400 is shown in the closed position. The interface surface 416 is at linked device end 402 (i.e. the "pager position) of the device 400 such that interface elements may be accessed by a user of the device 400 when the device 400 is in the closed position.

As the device is moved from the closed position shown in FIG. 13A to the partially opened position shown in FIG. 13B, the lid member 408 is rotated (clockwise in FIGS. 13A to 13C) with respect to the base member 410. The lid member 408 is rotated about the first pivot 418. Rotation of the lid member 408 about the first pivot 418 drives rotation of the second pivot 420 about the first pivot 418 also in a clockwise direction. The second pivot 420 is also linked to the fourth pivot 424 by the rotatable member 412. As the second pivot 420 rotates about the first pivot 418, the second pivot 420 also counter-rotates about the fourth pivot 424 (counter-clockwise in FIGS. 13A to 13B). The first and fourth pivots 418 and 424 initially move apart as the second pivot moves between them. The movement of the second and fourth pivots 420 and 424 define movement of the rotatable member 412. As can be seen in FIG. 13B, as the second pivot 420 counter-rotates about the fourth pivot 424, the rotatable member counter-rotates with respect to the lid member.

As the device is moved from the partially opened position shown in FIG. 13B to the fully opened position shown in FIG. 13C, the lid member 408 continues to rotate about the first pivot 418 and, therefore, the second pivot 420 continues to rotate about the first pivot 418 and counter rotate about the fourth pivot 424. After the second pivot passes between the first and fourth pivots 418 and 424, the first and fourth pivots begin to move closer to one another again. The double hinge linkage bar 426 is longer than the linkage between the pivots 420 and 418. Therefore, as the second pivot 420 continuously rotates, it passes under the double hinge linkage bar 426. The counter-rotation of the second pivot 420 about the fourth pivot 424 continues to counter-rotate the rotatable member 412.

Turning to FIG. 13C, when the lid member is rotated to the fully opened position, the rotatable member is counter-rotated such that the interface surface 416 is aligned with the inner lid member surface 428 of the lid member 408. The interface surface 416 is positioned between and concurrently viewable with the inner lid member surface 428 and the inner base member surface 430.

As will be appreciated by one skilled in the art, linkage mechanism 414 may similarly actuate the rotatable member 412 to rotate from the second rotational state to the first rotational state in response to the device 400 being moved from the opened to the closed position.

Unlike the device 100, as shown in FIGS. 1 to 12B, the rotatable member 412 experiences little or no translational movement away from, and back to, the lid member 408 and the base member 410 as the device 400 is opened. Therefore, more clearance distance between lid and the base members 408 and 410 is required to allow clearance of the corner edges of the rotatable member 412 during counter-rotation. As can be seen in FIG. 14, this may result in the gap 436 being larger than either of the base/rotatable member gap 130 or the lid/rotatable member gap 131 as shown in FIG. 1C. Therefore, a linkage mechanism which generates little or no translational movement as part of the counter-rotation of a rotatable member having interface elements may require larger gaps in between members when the device is in an opened position than a linkage mechanism which does actuate translational movement. However, linkage mechanism 414, which generates little or no translational movement, may use fewer parts thereby requiring less space around the sides of the device 400 to house linkage mechanism 414. Requiring less space around the sides of the device 400 may avoid the presence of gaps in the linkage mechanism or between the rotatable member 412 and the sides of the device 400.

In some embodiments, an over-centering spring (not shown), such as an extension spring, connected to the first and fourth pivots 418 and 424 which is biased against stretching or expanding may provide a force which biases the device 400 to remain in either the opened or closed position. The first and fourth pivots 418 and 424 move away from each other and then back toward each other throughout the entire movement of the device 400 from the closed to the fully opened position (as seen in FIGS. 13A to 13C). Therefore, force would have to be applied to the device to overcome the bias of the spring against stretching.

Although not illustrated in FIG. 14, the linked lid member end 409 of the lid member 408 may rotate in a plane adjacent to the linked base member end 411 of the base member 410, such that when the lid member 408 rotates with respect to the base member 410, the linked lid member end 409 of the lid member 408 does not interfere with linked base member end 411 of the base member 410. Interference between the lid and base members 408 and 410 may also be avoided by using other methods such as providing gaps or recesses in at least one of the lid and base members 408 and 410.

In some embodiments, interface elements may be on the top of a flip phone device when the device is in the closed position, rather than being located in the "pager position". Some embodiments may utilize a drive-pin which is engaged in a drive shaft to actuate movement of the rotatable member.

An embodiment of a flip phone device wherein interface elements are located on the top of the device when the device is closed, and which uses a drive-pin/drive shaft type linkage device, will now be described with reference to FIGS. 15A to 22.

Figure 15A:
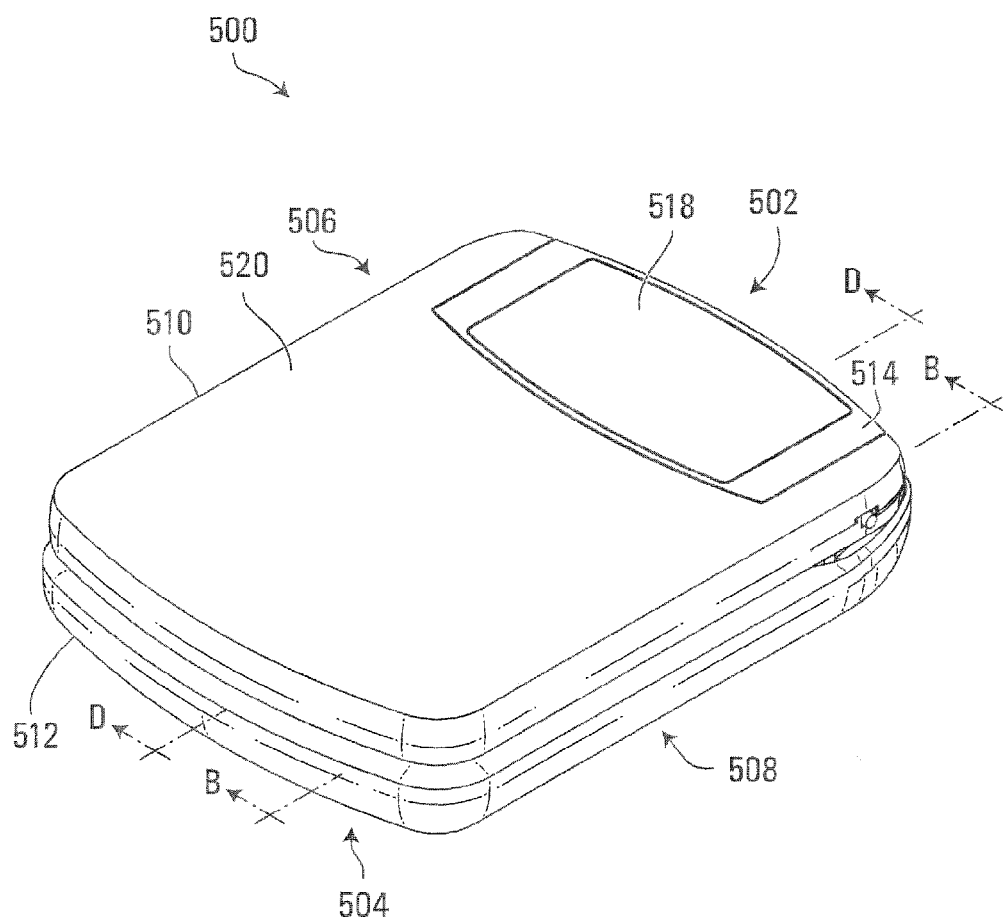
FIG. 15A is a perspective view of a mobile communication device according to a third embodiment in a closed position.
Figure 15B:
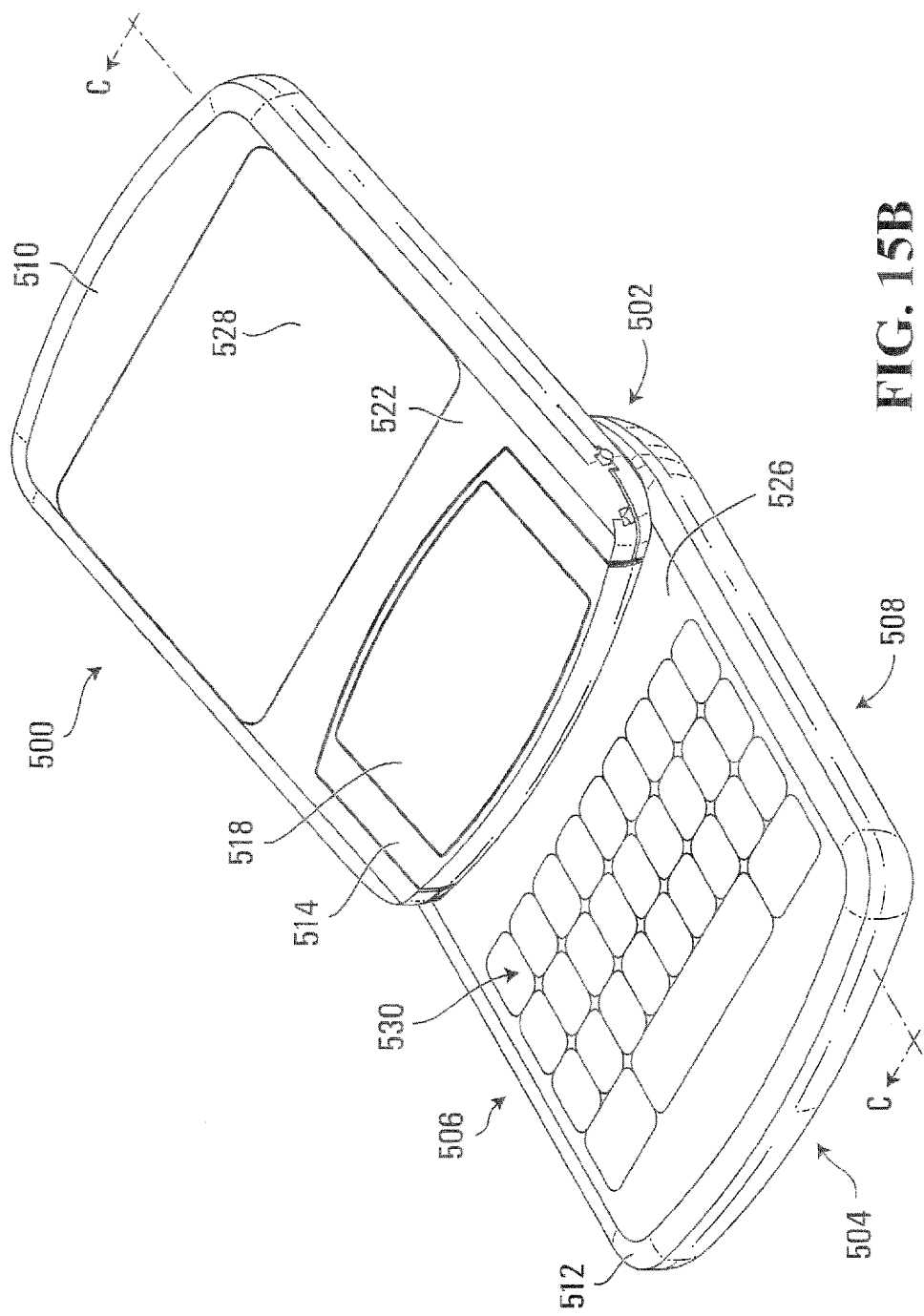
FIG. 15B is a perspective view of the mobile communication device of FIG. 15A in an opened position.

FIGS. 15A and 15B are perspective views of a flip phone device 500 in a closed position and an opened position respectively. The device 500 has a linked end 502, a free end 504, a first device side 506 and an opposite second device side 508. The device 500 includes a lid member 510, a base member 512, a rotatable member 514, and a linkage mechanism 516 (described below and shown assembled in FIGS. 20 to 22). The rotatable member 514 has a third or interface surface 518 which may include interface elements. The lid member has an outer lid member surface 520 (shown in FIG. 15A) and a first or inner lid member surface 522 (shown in FIG. 15B). The base member 512 has an outer base member surface 524 (shown in FIG. 17B) and a second or inner base member surface 526 (shown in FIG. 15B).

In this embodiment, the lid member 510 includes a graphical display 528 on the inner lid member surface 522 (shown in FIG. 15B). The base member 512 includes a keyboard 530 on the inner base member surface 526 (shown in FIG. 15B).

Turning to FIG. 15A, when the device is in the closed position, interface surface 518 is on the top of the device 500 in this embodiment. Specifically, the rotatable member 514 is aligned such that interface surface 518 is aligned with the outer lid member surface 520. This is the first rotational state of the rotatable member 514. It is to be understood that the interface surface 518 is not limited to the top of the device 500 in some embodiments.

Turning to FIG. 15B, in this embodiment, when the device 500 is in the open position, the lid member 510 is at an angle with respect to the base member 512. In some embodiments, the lid member 510 may be at an angle between 160 and 170 degrees with respect to the base member 512, although embodiments are not limited to such angles. In this embodiment, the interface surface 518 of the rotatable member 514 is aligned with the inner lid member surface 522, when the device 500 is in the opened position.

The linkage mechanism 516 (described below and shown assembled in FIGS. 20 to 22) hingeably couples the lid, base and rotatable members 510, 512 and 514 near the linked end 502 of the device 500 such that the device 500 can be moved between the closed and the opened positions. The linkage mechanism 516 actuates rotation of the rotatable member 514 from the first rotational state to a second rotational state in response to movement of the device 500 from the closed to the opened position. The linkage mechanism 516 also actuates rotation of the rotatable member 514 from the second to the first rotational state in response to movement of the device 500 from the opened position to the closed position.

As the device 500 is moved from the closed position shown in FIG. 15A to the opened position shown in FIG. 15B, the lid member 510 is rotated in a first direction of rotation with respect to the base member 512 such that the inner lid and base member surfaces 522 and 526 move apart. The rotatable member 514 is counter-rotated such that the interface surface 518 is aligned with the inner lid member surface 522 when the device reaches the opened position. For example, if the lid member is rotated to be at approximately a 165 degree angle to the base member 512 in the open position, the linkage mechanism 516 may counter-rotate the rotatable member 514 by approximately 15 degrees to align interface surface 518 with the inner lid member surface 522 and graphical display 528 of lid member 510 in the open position.

The flip phone device 500, and in particular the linkage mechanism 516, will now be described with reference to FIGS. 16A to 22. The linkage mechanism 516 includes elements of the lid member 510, the base member 512, and the rotatable member 514, as well as a rotation plate 532.

In the remaining discussion of the device 500, the direction extending perpendicularly away from the base member 512 and toward the lid member 510, when the device 500 is in the closed position, will be referred to as the upward direction. Conversely, the opposite direction will be referred to as the downward direction. The direction extending from the linked end 502 toward the free end 504 of the device, when the device is in the closed position, will be referred to as the forward direction. Conversely, the opposite direction will be referred to as the backward direction. The upward, downward, forward and backward directions are referenced to the base member 512 which is shown as remaining stationary relative to other elements of the device 500 in the figures.

Figure 16A:
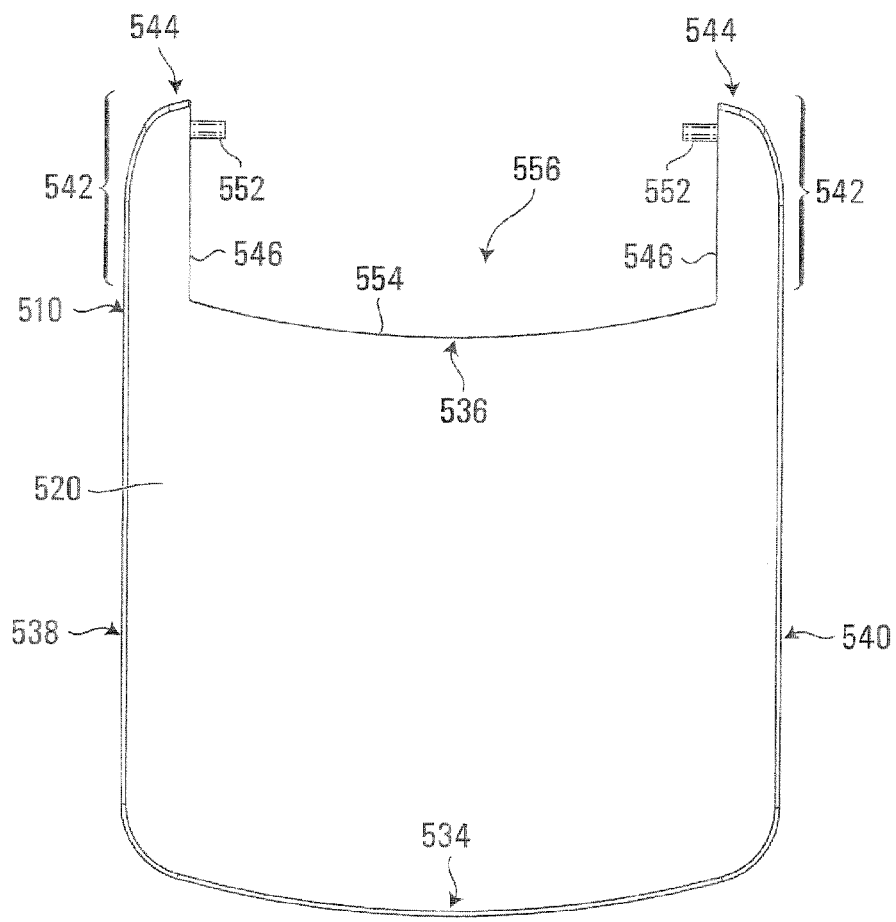
FIG. 16A is a top view of a lid member of the mobile communication device of FIG. 15A.
Figure 16B:
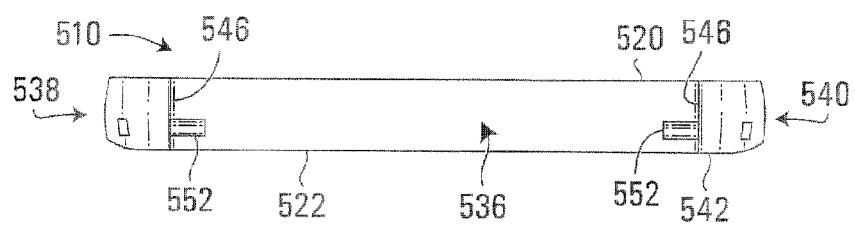
FIG. 16B is an end view of the lid member of FIG. 16A.
Figure 16C:
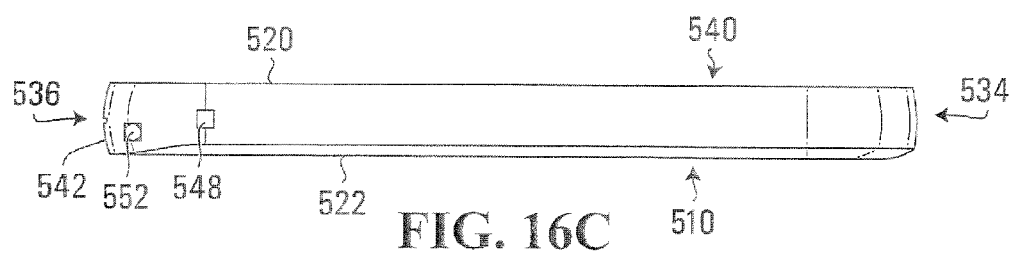
FIG. 16C is a side view of the lid member of FIG. 16A.

FIGS. 16A to 16C are top, end, and side views of the lid member 510 of the device 500 (shown in FIGS. 15A and 15B) respectively. The lid member 510 has a first lid member end 534 (shown in FIGS. 16A and 16C), a second lid member end 536, a first lid member side 538 (shown in FIGS. 16A and 16B) and an opposite second lid member side 540. The lid member 510 includes two hinge legs 542 which each depend from the second lid member end 536, toward the linked end 502 of the device 500, at a respective first lid member side 538 and 540. The hinge legs 542 each have a respective hinge leg end 544 and inner hinge leg surface 546. The hinge legs 542 each further include a lid member display axis pivot hole 548 (shown in FIG. 16C) approximately midway along the length of the respective hinge leg 542. Each display axis pivot hole 548 extends from a respective first and second lid member side 538 and 540 linearly through the width of the respective hinge leg 542 to the respective inner hinge leg surface 546.

The lid member 510 further includes two rotation driver pins 552 which each depend substantially perpendicularly and inwardly from a respective inner hinge leg surface 546 of the hinge legs 542 near their respective leg end 544. The lid member 510 further includes an edge surface 554 at the second lid member end 536 which extends between the hinge legs 542. The hinge legs 542 and the edge surface 554 define a lid/rotatable member clearance space 556 (as shown in FIG. 16A). As will be explained below, the lid/rotatable member clearance space 556 is shaped to accommodate the rotatable member 514.

Figure 17A:
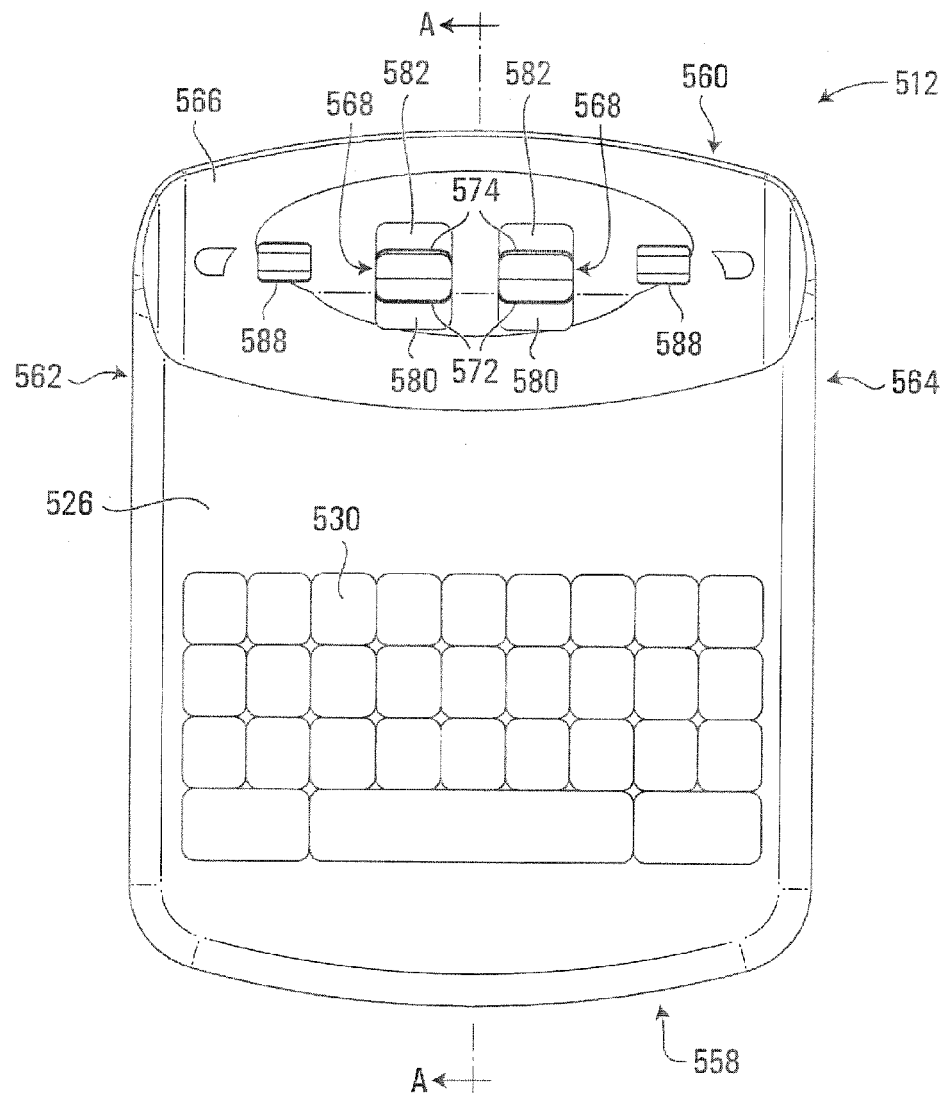
FIG. 17A is a top view of a base member of the mobile communication device of FIG. 15A.
Figure 17B:
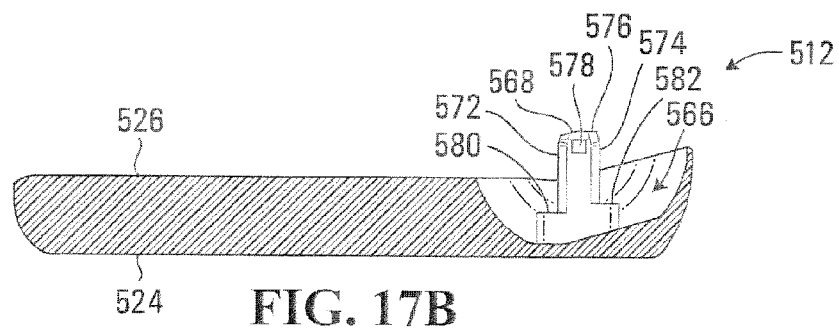
FIG. 17B is a cross-section side view of the base member of FIG. 17A taken along the line A-A in FIG. 17A.

FIG. 17A is a top view of the base member 512 of the device 500 (shown in FIGS. 15A and 15B) and FIG. 17B is a cross section view of the base member taken along the line A-A in FIG. 17A and in the direction indicated. The base member 512 has a first base member end 558, a second base member end 560, a first base member side 562 and an opposite second base member side 564. In this embodiment, the base member 512 includes a rotation plate recess 566 near the second base member end 560 which is generally concavely curved.

In this embodiment, the base member 512 further includes two display axis supports 568 that are each disposed substantially inward from respective first and second base member sides 562 and 564. The display axis supports 568 have a front support side 572, a back support side 574 and a top end 576 (shown in FIG. 17B). A base member display axis pivot hole 578 is disposed near the top end 576 of each display axis support 568.

In this embodiment, the display axis supports 568 each further include front and back angular control surfaces 580 and 582 which are substantially perpendicular and adjacent to respective front and back sides 572 and 574 of each support 568. The front angular control surface 580 is adjacent to the front support side 572 and is disposed slightly lower than the back angular control surface 582 which is adjacent to the back support side 574.

The base member 512 further includes two rotation plate axis pivot mounts 588 positioned between a respective display axis support 568 and a respective first and second base member side 562 and 564.

Figure 18A:
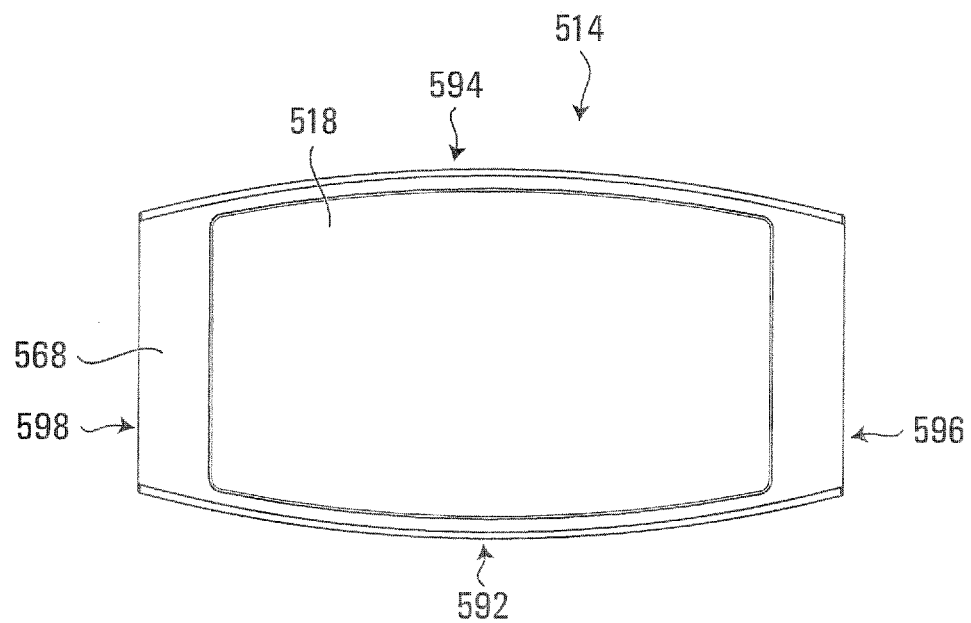
FIG. 18A is a top view of a rotatable member of the mobile communication device of FIG. 15A.
Figure 18B:
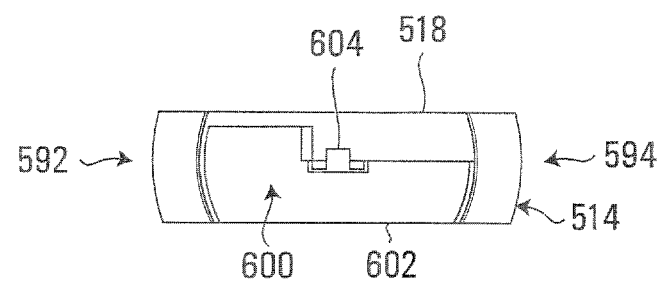
FIG. 18B is a side view of the rotatable member of FIG. 18A.

FIGS. 18A and 18B are top and side views of the rotatable member 514 of the device 500 (shown in FIGS. 15A and 15B) respectively. The rotatable member 514 has a front rotatable member end 592, a back rotatable member end 594, a first rotatable member side 596 and an opposite rotatable member side 598 (as shown in FIG. 15A). In this embodiment, the front and back ends 592 and 594 are convexly curved and the first and second rotatable member sides 596 and 598 are substantially straight, although other embodiments are not so limited. The front rotatable member end 592 and the first and second rotatable member sides 596 and 598 are shaped complimentary to the edge surface 554 and the inner hinge leg surfaces 546 (shown in FIG. 16A). Therefore, the clearance space 556 (shown in FIG. 16A) can accommodate the rotatable member 514.

A generally J-shaped recess 600 extends into each of the first and second rotatable member sides 596 and 598. The rotatable member 514 also includes a lower rotatable member surface 602, which is substantially flat, opposite to the interface surface 518 (shown in FIG. 18B). As will be described below, the lower rotatable member surface 602 and the J-shaped recess 600 of the rotatable member 514 are shaped to engage the rotation plate 532 (shown in FIGS. 19A to 19C).

The rotatable member 514 further defines a rotatable member display axis pivot hole 604 which extends through the rotatable member from the first rotatable member side 596 to the second rotatable member side 598.

Figure 19A:
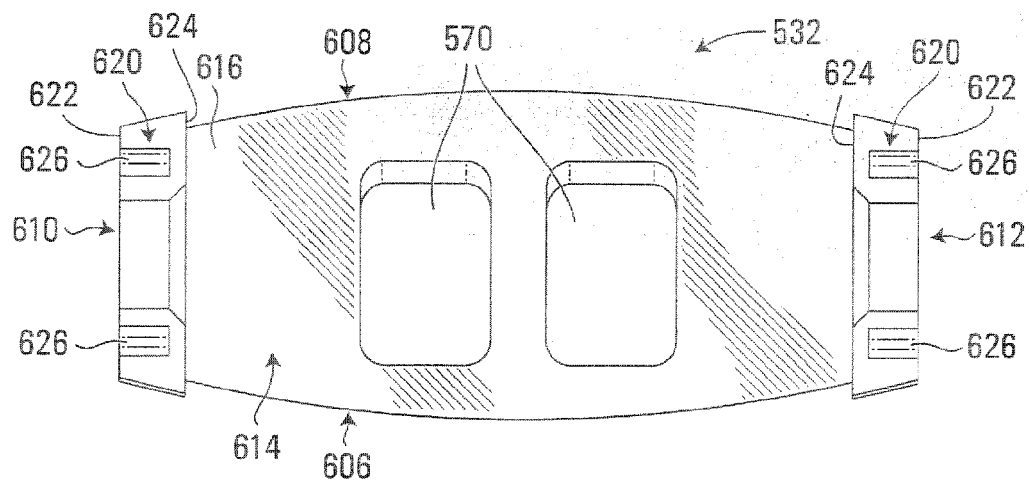
FIG. 19A is a top view of a rotation plate of the mobile communication device of FIG. 15A.
Figure 19B:
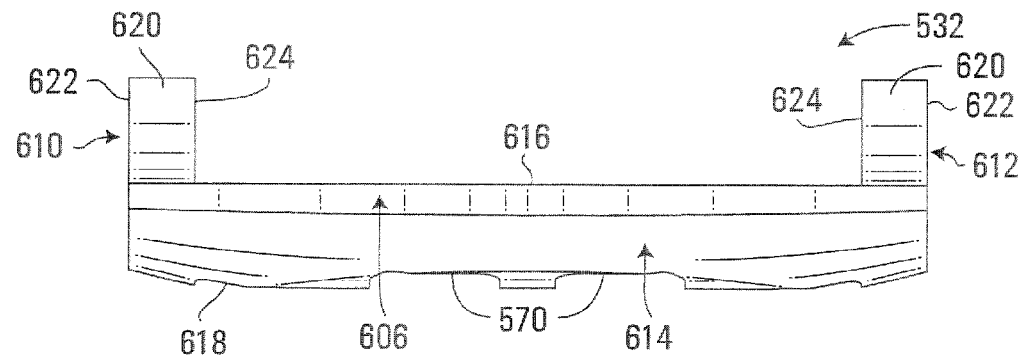
FIG. 19B is an end view of the rotation plate of FIG. 19A.
Figure 19C:
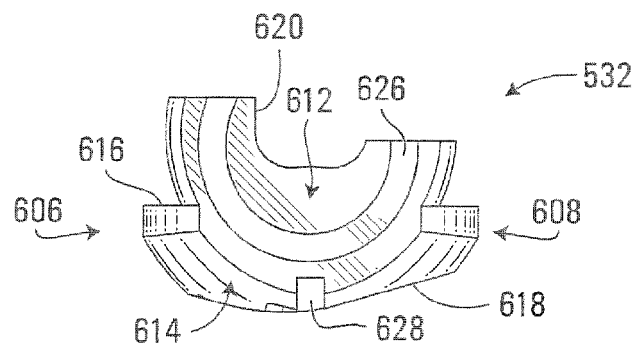
FIG. 19C is a side view of the rotation plate of FIG. 19A.

FIGS. 19A to 19C are top, end and side views of the rotation plate 532 of the device 500 (shown in FIGS. 15A and 15B) respectively. The rotation plate 532 has a front rotation plate end 606, a back rotation plate end 608, a first rotation plate side 610 and an opposite second rotation plate side 612. In this embodiment, the rotation plate 532 includes a base section 614. The rotation plate 532 also includes side sections 620, which are generally J-shaped, mirrored at each of the respective first and second rotation plate sides 610 and 612. The base section 614 has an upper rotation plate surface 616 which is substantially flat and a lower rotation plate surface 618 (shown in FIGS. 19B and 19C) which is generally convexly curved. The side sections 620 partially extend above the upper rotation plate surface 616 and have an outer side section surface 622 and an inner side section surface 624. The side sections 620 are shaped to be received in respective J-shaped recesses 600 of the rotatable member 514.

The rotation plate 532 further defines a rotation pin driver slot 626 in the outer side section surface 622 of each side section 620. The rotation pin driver slot 626 is curved and can slidably engage the rotation driver pins 552 of the lid member 510 (shown in FIGS. 16A and 16B). Display axis support clearance holes 570 are provided in the base section 614 and are sized and spaced to receive the display axis supports 568 of the base member 512 (shown in FIGS. 17A and 17B).

A rotation plate pivot hole 628 (shown in FIG. 19C) extends from the outer side section surface 622 of each side section 620, adjacent to the lower rotation plate surface 618, to a respective display axis support clearance hole 570. Although FIG. 19C only shows the rotation plate pivot hole 628 of one second rotation plate side 612 of the rotation plate, it is to be understood that a mirrored rotation plate pivot hole is present on the opposite first rotation plate side 610. The rotation plate pivot holes 628 are below the respective rotation pin driver slots 626.

The rotation plate recess 566 of the base member 512 (shown in FIGS. 17A and 17B) are shaped generally concave to receive the rotation plate 532 and to provide clearance for the rotation of the rotation plate 532 and the rotatable member 514 (as shown in FIGS. 15A and 15B) between the first and second rotational states.

Again, the specific design of elements of the linkage mechanism 514 is implementation specific and embodiments are not limited to the specific linkage mechanism 514 described herein.

Figure 20:
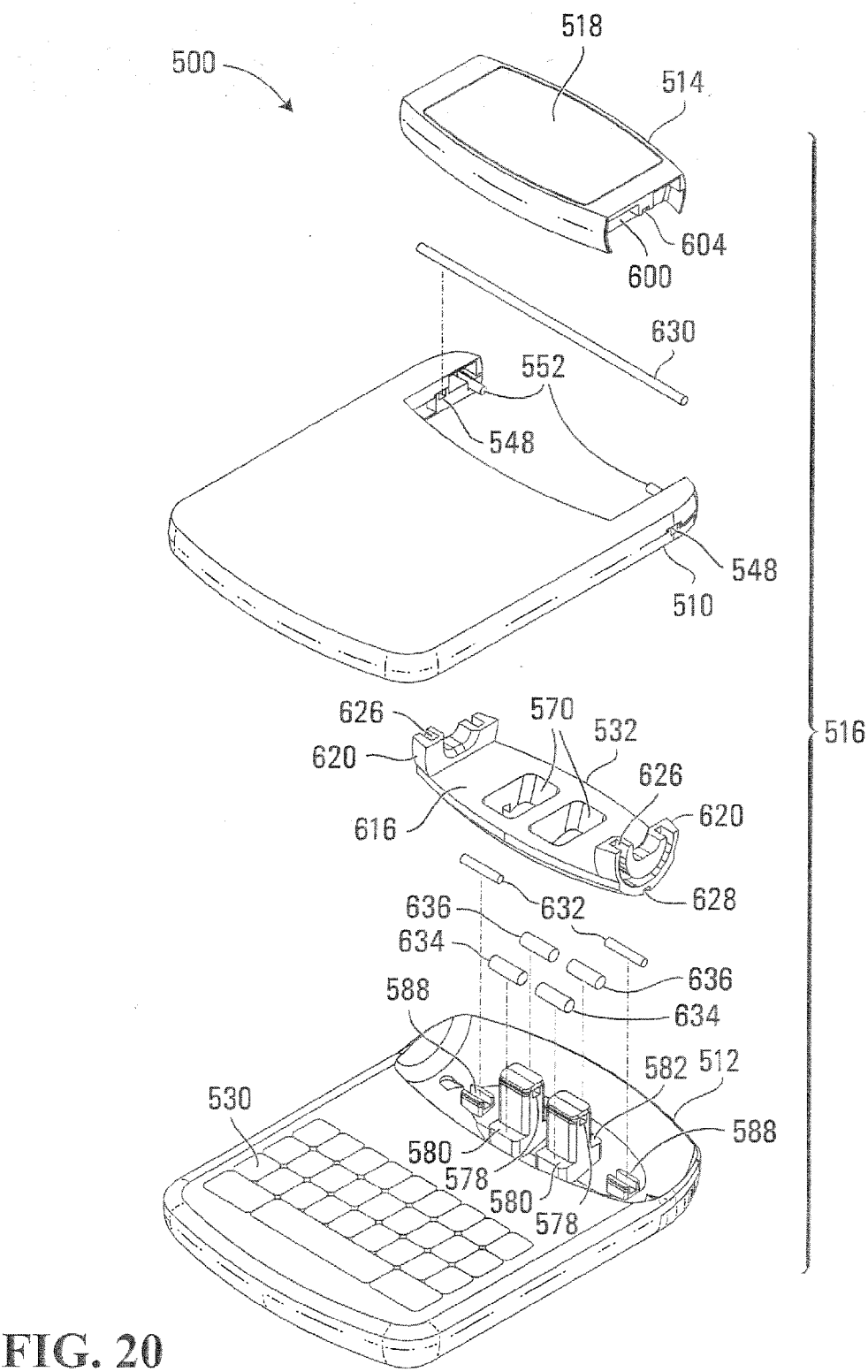
FIG. 20 is a partially exploded perspective view of the mobile communication device of FIG. 15A.

FIG. 20 is an exploded perspective view of the flip phone device 500 that shows the elements described above with reference to FIGS. 16A to 19C. In addition, FIG. 20 shows a display axis shaft 630, two rotation plate axis shafts 632, and front and back rubber stops 634 and 636. The lid, base, and rotatable member display axis pivot holes 548, 578 and 604 are shaped for receiving the display axis shaft 630. Each rotation plate axis pivot mount 588 of the base member 512 and a respective rotation plate pivot hole 628 of the rotation plate 532 are shaped to receive a respective rotation plate axis shaft 632. The angular control surfaces 580 and 582 are configured to receive respective front and back rubber stops 634 and 636. Front and back rubber stops 634 and 636 may dampen impact of the rotatable member 514.

The rotation plate 532 is received in rotation plate recess 566 of the base member 512 such that the rotation plate axis pivot holes 588 and 628 are aligned and display axis supports 568 protrude through display axis support clearance holes 570. The rotation plate axis shafts 632 are received in the rotation plate axis pivot mounts 588 and 628 of the base member 512 and the rotation plate 532 respectively. Thus, the rotation plate 532 is rotatable about the rotation plate axis shafts 632 (a first axis of rotation). The display axis shaft 630 is received in the lid, base, and rotatable member display axis pivot holes 548, 578 and 604 to rotatably couple the rotatable member 514, the lid member 510 and the base member 512. Thus, the rotatable member 514, including the, rotation pin driver slot 626, is rotatable about the display axis shaft 630 (a second axis of rotation).

Each rotation driver pin 552 of the lid member 510 slidably engages a respective rotation pin driver slot 626 of the rotation plate 532. Movement of the rotation driver pins 552 are constrained to travel within the respective pin driver slot 626.

The rotation plate 532 engages the rotatable member 514 such that movement of the rotation plate 532 is transferred to the rotatable member 514. Specifically, the rotatable member 514 position is fixed by its display axis pivot 604 rotating about the display axis shaft 630 which is supported by the display axis supports 568 of the base member 512. The upper rotation plate surface 616 and the lower rotatable member surface 602 are in contact with each other, and the upper rotation plate surface 616 communicates angular movement to the rotatable member 514. Therefore, rotational movement of the rotation plate 532 actuates rotational movement of the rotatable member 514 about display axis shaft 630.

The interaction and movement of the elements of the device 500 will now be described with reference to FIGS. 21A and 21B. For simplicity, the remaining discussion of the linkage mechanism 516 will refer to one side of the device 500 and the linkage mechanism 516 only (as shown in FIG. 20). It is to be understood that the elements described are mirrored on both sides of the device 500 in this embodiment, although embodiments are not so limited.

Figure 21A:
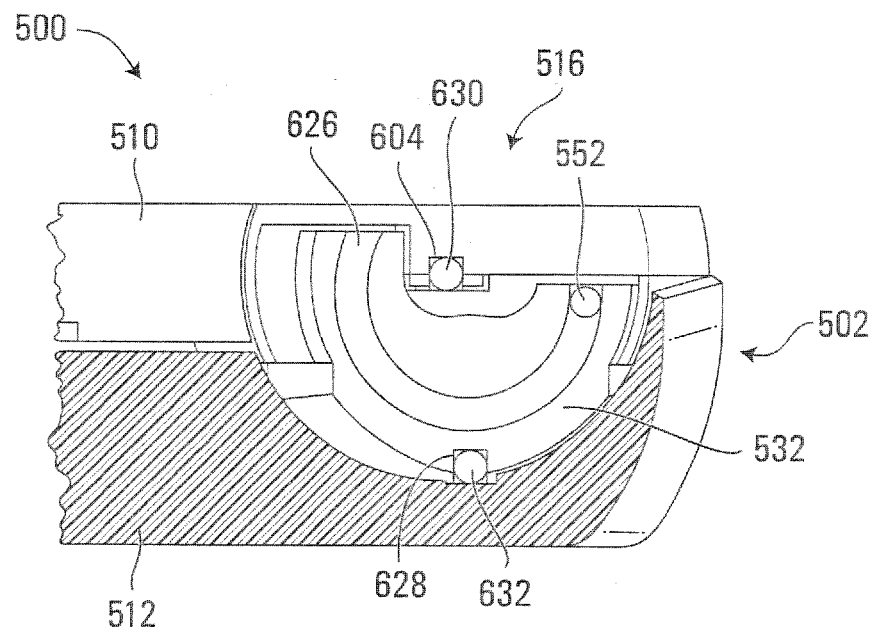
FIG. 21A is a cross-section partial side view of the mobile communication device of FIG. 15A in the closed position taken along the line B-B in FIG. 15A and in the direction indicated.
Figure 21B:
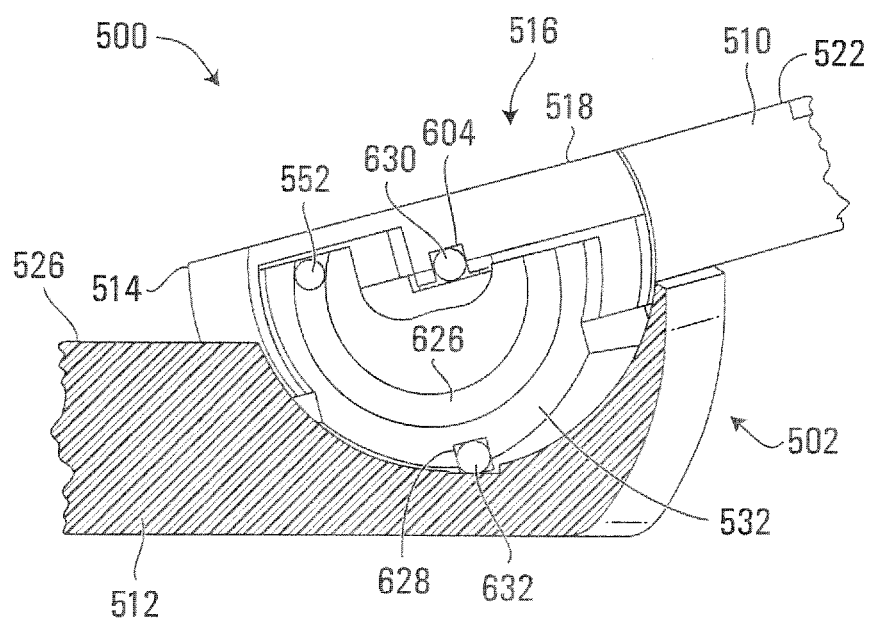
FIG. 21B is a cross-section partial side view of the mobile communication device of FIG. 15B in the opened position taken along the line C-C in FIG. 15B and in the direction indicated.

FIGS. 21A and 21B are enlarged cross section partial side views of the device taken along lines B-B and C-C in FIGS. 15A and 15B respectively. FIG. 21A shows the device 500 in the closed position and FIG. 21B shows the device 500 in the opened position.

As can be seen in FIG. 21A, the profile of rotation pin driver slot 626 is asymmetrical with respect to display axis shaft 630. When the device 500 is in the closed position, rotation pin driver slot 626 is biased toward end 502 of the device 500 with respect to the display axis shaft 630. The rotation plate 532 is positioned such that interface surface 518 of the rotatable member 514 is parallel with the lid member 510, and interface surface 518 is aligned with the outer lid member surface 520 of the lid member 510. This position of the rotatable member 514 constitutes the first rotational state.

As the device moves from the closed position shown in FIG. 21A to the opened position shown in FIG. 21B, the lid member 510 rotates (clockwise in FIGS. 21A and 21B) about the display rotation axis defined by display axis shaft 630 and rotates with respect to the base member 512. As the lid member 510 rotates, the rotation driver pin 552 travels in the rotation pin driver slot 626 in the same direction of rotation. The distance between the rotation driver pin 552 and the display axis shaft 630 is constant. However, as mentioned above, the rotation pin driver slot 626 is asymmetrically shaped about the display axis shaft 630. Therefore, rotation of the rotation driver pin 552 symmetrically about the display axis shaft 630, while constrained to the rotation pin driver slot 626, will cause corresponding movement in the rotation plate 532. Movement of the rotation driver pin 552 from a starting position, where the device 500 is closed, to an ending position, where the device 500 is opened, actuates a movement of the rotation plate 532 from a position biased toward the end 502 of the device, with respect to the display axis shaft 630, to a position biased away from the end 502 of the device. Because the rotation plate pivot 628 is underneath the rotation pin driver slot 626, the change in the bias position of the rotation plate 532 will drive a rotation of the rotation plate 532 in the counter-rotation direction (counter-clockwise in FIGS. 21A and 21B) with respect to the lid member 510.

Rotation of the rotation plate 532 is followed by the rotatable member 514. As the device is opened, the rotatable member will rotate from the first rotational state to the second rotational state. Similarly, closing the device 500 will actuate rotation of the rotatable member 514 from the second rotational state back to the first rotational state shown in FIG. 21A. Interface surface 518 may, therefore, be conveniently accessible by a user of the device 500 when the device 500 is in both the opened and closed positions.

Turning to FIG. 21B, in the opened position, the lid member 510 has been rotated to an angle with respect to the base member 512, and the rotatable member 514 may be counter-rotated such that interface surface 518 including interface elements (as shown in FIGS. 15A and 15B) are aligned with the inner lid member surface 522. The interface surface 518 is positioned between and concurrently viewable with the inner lid member surface 522 and the inner base member surface 526. Therefore, interface surface 518 may be aligned with graphical display 528 of the device 500 and may be conveniently accessible to a user of the device 500 when the device 500 is in the opened position. This position of the rotatable member 514 constitutes the second rotation state.

The profile of the rotation pin driver slots 626 defines the ratio of angular movement of the lid member 510 and the angular movement of the rotation plate 532. In some embodiments, the lid member 510 may be rotated by 165 degrees and the rotatable member may be counter-rotated by 15 degrees, though embodiments are not so limited. A person skilled in the art will understand that other angles may be achieved through design choices without departing from the scope of embodiments. Similarly, the rotatable member 514 need not be aligned or flush with the lid member 510 in the opened position and the rotatable member could be counter-rotated more or less than shown in FIG. 21B.

Figure 22:
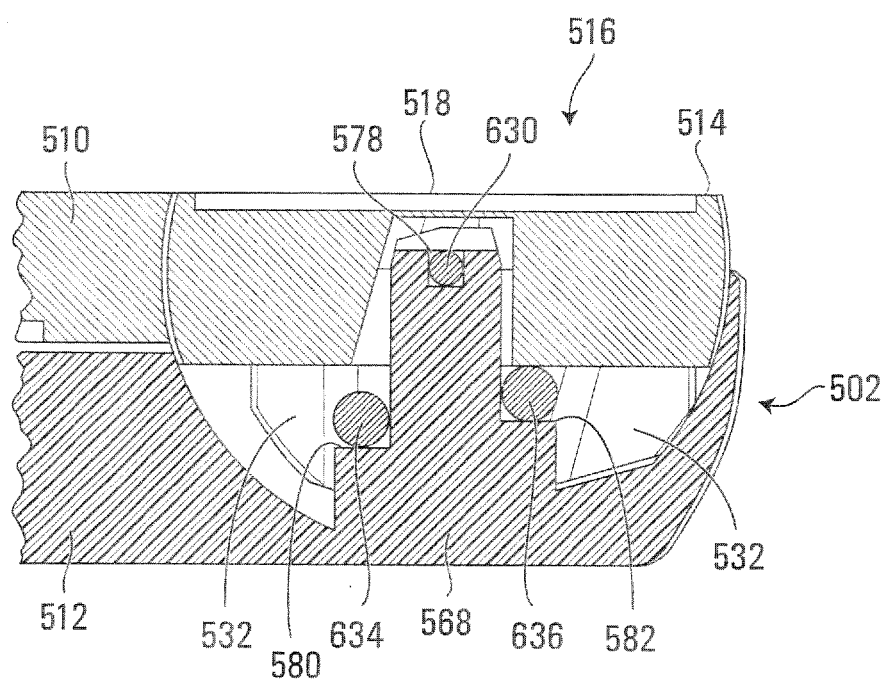
FIG. 22 is a partial cross-section side view of the mobile communication device of FIG. 15A in the closed position taken along the line D-D in FIG. 15A and in the direction indicated.

FIG. 22 is an enlarged cross section partial view of the device 500 taken along the line D-D in FIG. 15A which illustrates the interaction between the rotation plate 532 and the front and back angular control surfaces 580 and 582 of the base member 512 in some embodiments. FIG. 22 shows the lid member 510, the base member 512 including, the rotation plate 532, the rotatable member 514 including the interface surface 518, display axis shaft 630 including base member display axis pivot hole 578 and angular control surfaces 582 and 580. The back angular control surface 582, including the back rubber stop 636, may act as a physical stop to limit the rotation of the rotation plate 532 when the device is closed. Similarly, the front angular control surface 580, including the front rubber stop 634, may act as a physical stop to limit the rotation of the rotation plate 532 when the device is opened.

The device 500 as described in reference to FIGS. 15A to 22, is only one example of a flip phone device including the linkage mechanism 516, which may be used to achieve the proper rotation of the rotatable member in accordance with some embodiments. It is to be understood that embodiments are not limited to the device 500 as described with reference to FIGS. 15A to 22.

As will be apparent to one skilled in the art, in some embodiments, wires may be arranged in a linkage mechanism to electrically connect components in each of the lid, base, and the rotatable members together, although such electrical connections are not shown or described herein. Electrical connections may also be made wirelessly.

What has been described is merely illustrative of the application of the principles of some embodiments. Other arrangements and methods can be implemented by those skilled in the art without departing from the spirit and scope of the application.

The invention claimed is:

1. A mobile communication device comprising:
a first member having a first surface;
a second member having a second surface;
a rotatable member having a third surface; and
a linkage mechanism which hingeably couples the first member, the second member and the rotatable member such that the device has a closed position and an opened position,
the first surface and the second surface being inaccessible when the device is in the closed position and the first surface and the second surface being accessible when the device is in the opened position,
the rotatable member having a first rotational state such that the third surface is accessible when the device is in the closed position, and a second rotational state such that the third surface is positioned between and concurrently viewable with the first surface and the second surface when the device is in the opened position,
the linkage mechanism being configured to actuate movement of the rotatable member from the first rotational state to the second rotational state responsive to movement of the device from the closed position to the open position, and
the linkage mechanism being further configured to actuate movement of the rotatable member from the second rotational state to the first rotational state responsive to movement of the device from the open position to the closed position.

2. The device of claim 1, wherein the third surface includes at least one of a control surface, a graphical display, one or more keys, and a touch screen.

3. The device of claim 2, wherein the third surface is flush with the first surface when the rotatable member is in the second rotational state.

4. The device of claim 1, wherein the movement of the device from the closed position to the opened position comprises rotational movement of the first member with respect to the second member in a first direction of rotation;

the movement of the device from the opened position to the closed position comprises rotational movement of the first member with respect to the second member in a second direction of rotation opposite to the first direction of rotation;

the movement of the rotatable member from the first rotational state to the second rotational state comprises rotational movement in the second direction of rotation; and the movement of the rotatable member from the second rotational state to the first rotational state comprises rotational movement in the first direction of rotation.

5. The device of claim 1, wherein the movement of the rotatable member from the first rotational state to the second rotational state and the movement of the rotatable member from the second rotational state to the first rotational state further comprise a translational movement.

6. The device of claim 5, wherein the translational movement comprises an initial translational movement away from the first member and the second member and a subsequent translational movement toward the first member and the second member.

7. The device of claim 1, wherein the linkage mechanism comprises a system of linkages intermediate to the first member, the second member and the rotatable member, said linkages being pivotably connected to the first member, the second member and the rotatable member.

8. The device of claim 7 wherein
the first member, the second member and the rotatable member each comprise a respective one of said linkages, and
at least one additional link member comprises another one or more of said linkages.

9. The device of claim 1, wherein the linkage mechanism comprises a four-bar linkage.

10. The device of claim 1, wherein the linkage mechanism comprises:
at least one rotation driver pin attached to the first member; and
at least one rotation pin driver slot in rotational communication with the rotatable member, wherein
travel of the at least one rotation driver pin within the respective at least one rotation pin driver slot actuates said movement of the rotatable member from the first rotational state to the second rotational state and said movement from the second rotational state to the first rotational state.

11. The device of claim 10, wherein,
the at least one rotation pin driver slot is rotatable about a first axis shaft,
the rotatable member is rotatable about a second axis shaft, and
the at least one rotation pin driver slot is asymmetric about the second axis shaft.

12. The device of claim 1, wherein the third surface is disposed on an end of the device near the linkage mechanism when the device is in the closed position.

13. The device of claim 1, wherein the third surface is disposed on a top of the device when the device is in the closed position.

14. A linkage mechanism for hingeably coupling a first member, a second member and a rotatable member of a mobile communication device, the first member, the second member, and the rotatable member having a first surface, a second surface, and a third surface respectively, the linkage mechanism comprising:
a system of linkages intermediate to the first member, the second member, and the rotatable member, said linkages being pivotably connected to the first member, the second member, and the rotatable member such that the device has a closed position and an opened position, wherein
the linkage mechanism actuates movement of the rotatable member from a first rotational state to a second rotational state responsive to movement of the device from the closed to the opened position, and
the linkage mechanism actuates movement of the rotatable member from the second rotational state to the first rotational state responsive to movement of the device from the open position to the closed position.

15. The linkage mechanism of claim 14, wherein the third surface is positioned between and concurrently viewable with the first surface and the second surface when the rotatable member is in the second rotational state.

16. The linkage mechanism of claim 14, wherein the movement of the device from the closed position to the opened position comprises rotational movement of the first member with respect to the second member in a first direction of rotation,
the movement of the device from the opened position to the closed position comprises rotational movement of the first member with respect to the second member in a second direction of rotation opposite to the first direction of rotation,
the movement of the rotatable member from the first rotational state to the second rotational state comprises rotational movement in the second direction of rotation, and
the movement of the rotatable member from the second rotational state to the first rotational state comprises rotational movement in the first direction of rotation.

17. The linkage mechanism of claim 14, wherein the first member, the second member, and the rotatable member each comprise a respective one of said linkages, and
at least one additional link member comprises another one or more of said linkages.

18. The linkage mechanism of claim 14, wherein the movement of the rotatable member from the first rotational state to the second rotational state and the movement of the rotatable member from the second rotational state to the first rotational state further comprise a translational movement.

19. The linkage mechanism of claim 18, wherein the translational movement comprises initial translational movement away from the first member and the second member and subsequent translational movement toward the first member and the second member.

20. A linkage mechanism for hingeably coupling a first member, a second member and a rotatable member of a mobile communication device such that the device has an opened position and a closed position, the first member, the second member, and the rotatable member having a first surface, a second surface, and a third surface respectively, the linkage mechanism comprising:
at least one rotation driver pin attached to the first member; and
at least one rotation pin driver slot in rotational communication with the rotatable member, wherein
the linkage mechanism actuates movement of the rotatable member from a first rotational state to a second rotational state responsive to movement of the device from the closed to the opened position,
the linkage mechanism actuates movement of the rotatable member from the second rotational state to the first rotational state responsive to movement of the device from the open position to the closed position, and travel of the at least one rotation driver pin within the respective at least one rotation pin driver slot actuates said movement of the rotatable member from the first rotational state to the second rotational state and said movement from the second rotational state to the first rotational state.

* * * * *